US012566317B2

(12) United States Patent
Zhou et al.

(10) Patent No.: US 12,566,317 B2
(45) Date of Patent: Mar. 3, 2026

(54) CAMERA LENS ASSEMBLY INCLUDING SIX LENSES OF −+−++−, ++−−+− and ++−++− REFRACTIVE POWERS

(71) Applicant: ZHEJIANG SUNNY OPTICS CO., LTD., Zhejiang (CN)

(72) Inventors: Jin Zhou, Zhejiang (CN); Jianke Wenren, Zhejiang (CN); Fujian Dai, Zhejiang (CN); Liefeng Zhao, Zhejiang (CN)

(73) Assignee: ZHEJIANG SUNNY OPTICS CO., LTD., Yuyao Zhejiang (CN)

( * ) Notice: Subject to any disclaimer, the term of this patent is extended or adjusted under 35 U.S.C. 154(b) by 989 days.

(21) Appl. No.: 17/164,181

(22) Filed: Feb. 1, 2021

(65) Prior Publication Data

US 2021/0333514 A1     Oct. 28, 2021

(30) Foreign Application Priority Data

Apr. 28, 2020   (CN) .......................... 202010349042.1

(51) Int. Cl.
*G02B 13/00*          (2006.01)
*G02B 9/62*           (2006.01)

(52) U.S. Cl.
CPC ........... *G02B 13/0045* (2013.01); *G02B 9/62* (2013.01)

(58) Field of Classification Search
CPC ....... G02B 13/0045; G02B 9/62; G02B 13/06
See application file for complete search history.

(56) References Cited

U.S. PATENT DOCUMENTS 9,971,126  B2 *  5/2018  Chen .......................... G02B 9/62
10,054,768 B2    8/2018  Lee
10,082,646 B2    9/2018  Hsueh et al.
10,324,270 B2 *  6/2019  Huang ............... G02B 13/0045
10,330,891 B2    6/2019  Chen et al.
                 (Continued)

FOREIGN PATENT DOCUMENTS

CN         104516094 A     4/2015
CN         104570279 A     4/2015
                 (Continued)

OTHER PUBLICATIONS

First Examination Report dated Jan. 13, 2022, in connection with India Patent Application No. 202114004723.

*Primary Examiner* — Wen Huang
(74) *Attorney, Agent, or Firm* — Norris McLaughlin, PA

(57)          ABSTRACT

The present disclosure discloses a camera lens assembly including, sequentially from an object side to an image side along an optical axis, a stop; a first lens having refractive power; a second lens having positive refractive power, a convex object-side surface and a convex image-side surface; a third lens having negative refractive power and a concave image-side surface; a fourth lens having refractive power; a fifth lens having refractive power and a convex image-side surface; and a sixth lens having negative refractive power and a concave image-side surface. A combined focal length f12 of the first lens and the second lens and half of a maximum field-of-view Semi-FOV of the camera lens assembly satisfy: 1.00 mm<f12/tan(Semi-FOV)<4.50 mm. A maximum field-of-view FOV of the camera lens assembly satisfies: 91.0°<FOV.

15 Claims, 9 Drawing Sheets

(56) References Cited

U.S. PATENT DOCUMENTS

| | | | |
|---|---|---|---|
| 10,451,842 B2 | 10/2019 | Chae | |
| 10,712,538 B2 | 7/2020 | Zhang et al. | |
| 10,795,119 B2 | 10/2020 | Chen et al. | |
| 10,895,716 B2 | 1/2021 | Kuo | |
| 10,935,762 B2 | 3/2021 | Liao et al. | |
| 11,221,464 B2 | 1/2022 | Oinuma et al. | |
| 11,733,491 B2 | 8/2023 | Liu | |
| 11,808,922 B2 | 11/2023 | Ding | |
| 11,982,792 B2 | 5/2024 | Li et al. | |
| 12,181,634 B2 | 12/2024 | Jia et al. | |
| 2005/0200978 A1* | 9/2005 | Tesar | G02B 27/0025 359/754 |
| 2015/0022905 A1* | 1/2015 | Shinohara | G02B 13/04 359/740 |
| 2015/0085135 A1* | 3/2015 | Chen | H04N 23/57 359/740 |
| 2015/0098135 A1 | 4/2015 | Chung et al. | |
| 2015/0109684 A1 | 4/2015 | Son | |
| 2015/0124332 A1 | 5/2015 | Noda et al. | |
| 2015/0241656 A1 | 8/2015 | Choi | |
| 2015/0362702 A1 | 12/2015 | Tang et al. | |
| 2016/0147044 A1 | 5/2016 | Kondo | |
| 2016/0161716 A1* | 6/2016 | Chae | G02B 13/0045 359/713 |
| 2016/0216486 A1* | 7/2016 | Tanaka | G02B 9/62 |
| 2016/0282588 A1 | 9/2016 | Sekine et al. | |
| 2016/0341935 A1* | 11/2016 | Chen | G02B 13/0045 |
| 2017/0184817 A1* | 6/2017 | Lee | G02B 13/0045 |
| 2017/0235102 A1* | 8/2017 | Lai | G02B 13/06 359/713 |
| 2018/0039046 A1 | 2/2018 | Lee et al. | |
| 2018/0136443 A1* | 5/2018 | Yin | G02B 13/0045 |
| 2018/0143405 A1* | 5/2018 | Hsueh | G02B 9/62 |
| 2018/0284393 A1* | 10/2018 | Huang | G02B 13/0045 |
| 2018/0356614 A1 | 12/2018 | Hsueh et al. | |
| 2019/0154971 A1* | 5/2019 | Sato | G02B 13/0045 |
| 2019/0170976 A1* | 6/2019 | Sato | G02B 9/64 |
| 2019/0196144 A1* | 6/2019 | Chen | G02B 27/0025 |
| 2019/0369368 A1* | 12/2019 | Jung | G02B 3/02 |
| 2020/0209542 A1* | 7/2020 | Hsueh | G02B 15/167 |
| 2021/0132338 A1* | 5/2021 | Lin | G02B 13/0045 |
| 2021/0157102 A1* | 5/2021 | Son | G02B 9/62 |
| 2021/0191086 A1* | 6/2021 | Nitta | G02B 9/62 |
| 2021/0311288 A1* | 10/2021 | Ding | G02B 13/04 |
| 2021/0333514 A1 | 10/2021 | Zhou et al. | |
| 2021/0389557 A1* | 12/2021 | Zou | G02B 13/04 |

FOREIGN PATENT DOCUMENTS

| | | |
|---|---|---|
| CN | 204422845 U | 6/2015 |
| CN | 104865674 A | 8/2015 |
| CN | 105278085 A | 1/2016 |
| CN | 105676418 A | 6/2016 |
| CN | 106405794 A | 2/2017 |
| CN | 206039010 U | 3/2017 |
| CN | 206074890 U | 4/2017 |
| CN | 106918898 A | 7/2017 |
| CN | 107085281 A | 8/2017 |
| CN | 107515456 A | 12/2017 |
| CN | 107688223 A | 2/2018 |
| CN | 108089278 A | 5/2018 |
| CN | 108508577 A | 9/2018 |
| CN | 108627953 A | 10/2018 |
| CN | 109031589 A | 12/2018 |
| CN | 109100854 A | 12/2018 |
| CN | 208752296 U | 4/2019 |
| CN | 110133830 A | 8/2019 |
| CN | 110286471 A | 9/2019 |
| CN | 110501807 A | 11/2019 |
| CN | 110850558 A | 2/2020 |
| CN | 110888221 A | 3/2020 |
| CN | 111025580 A | 4/2020 |
| CN | 111123485 A | 5/2020 |
| CN | 111158113 A | 5/2020 |
| CN | 111158123 A | 5/2020 |
| CN | 111175945 A | 5/2020 |
| CN | 111258036 A | 6/2020 |
| CN | 211826693 U | 10/2020 |
| CN | 212009122 U | 11/2020 |
| CN | 112444940 A | 3/2021 |
| CN | 113467051 A | 10/2021 |
| CN | 114488488 A | 5/2022 |
| JP | 2014044250 A | 3/2014 |
| KR | 100647555 B1 | 11/2006 |
| TW | 674433 B | 10/2019 |

* cited by examiner

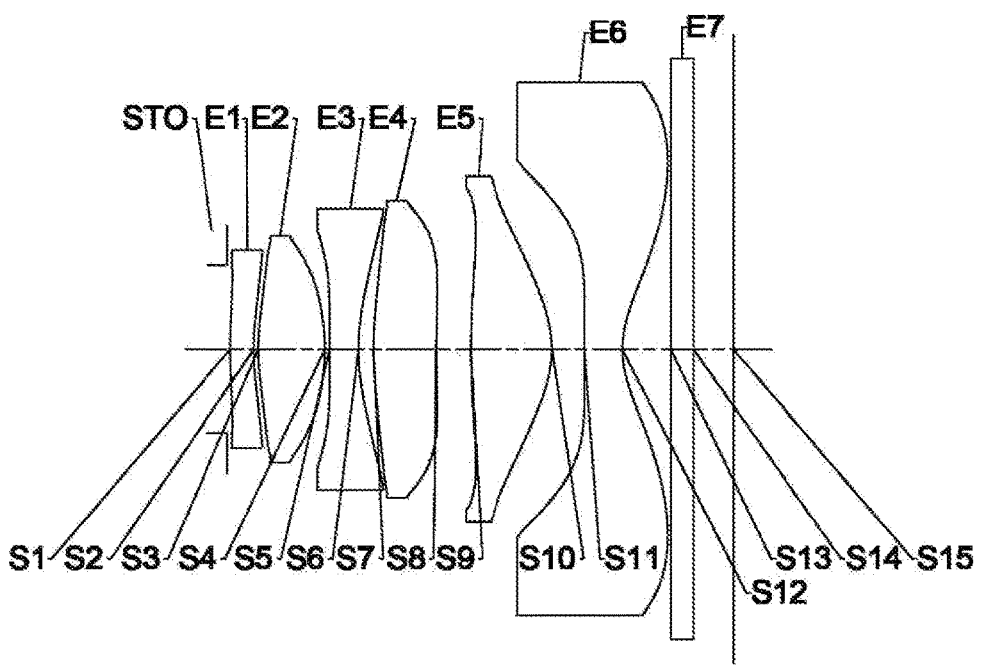
Fig. 1
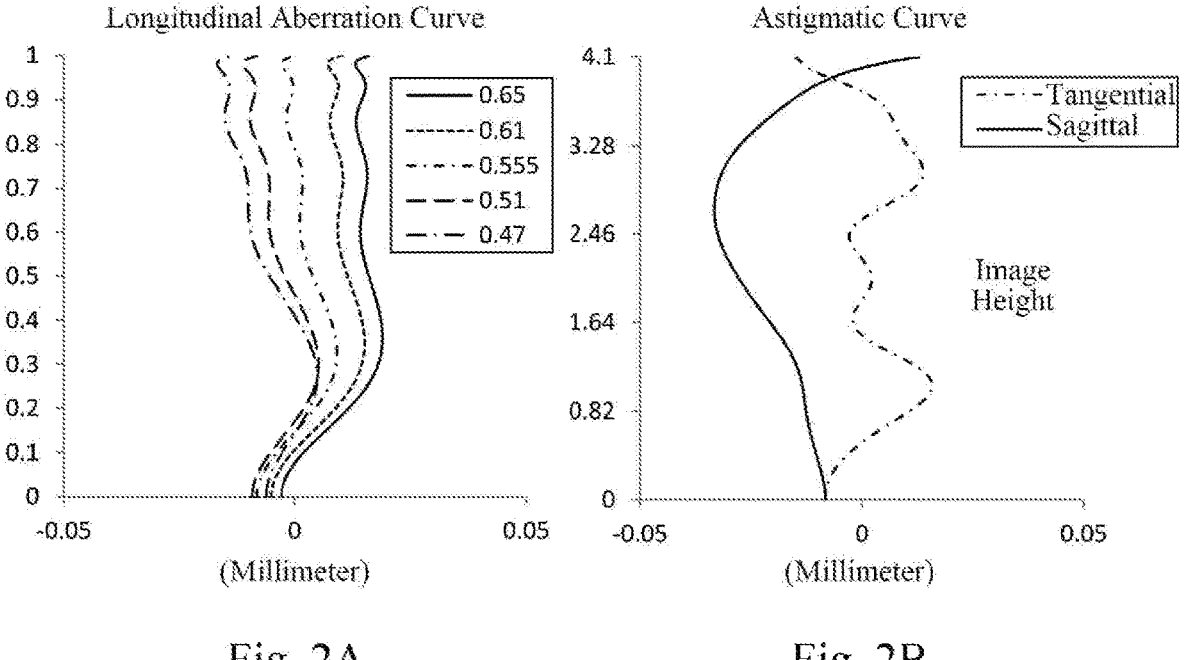
Fig. 2A                                    Fig. 2B

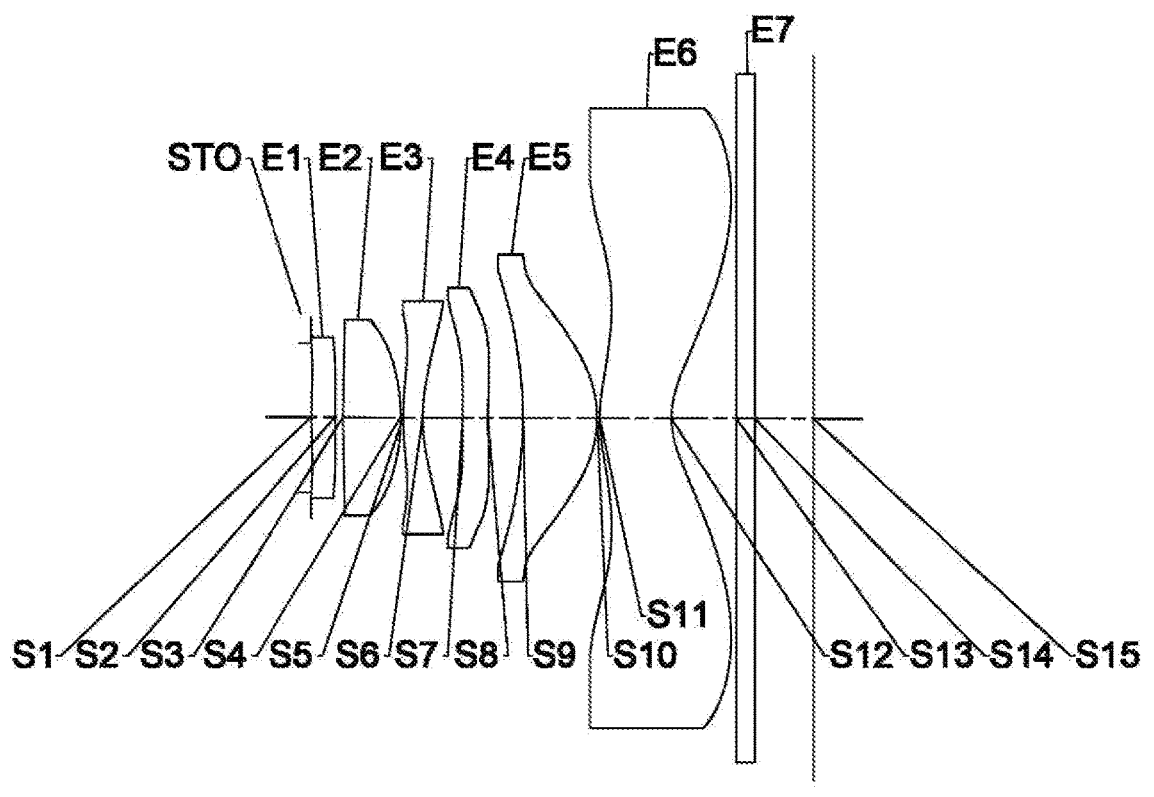
Fig. 5
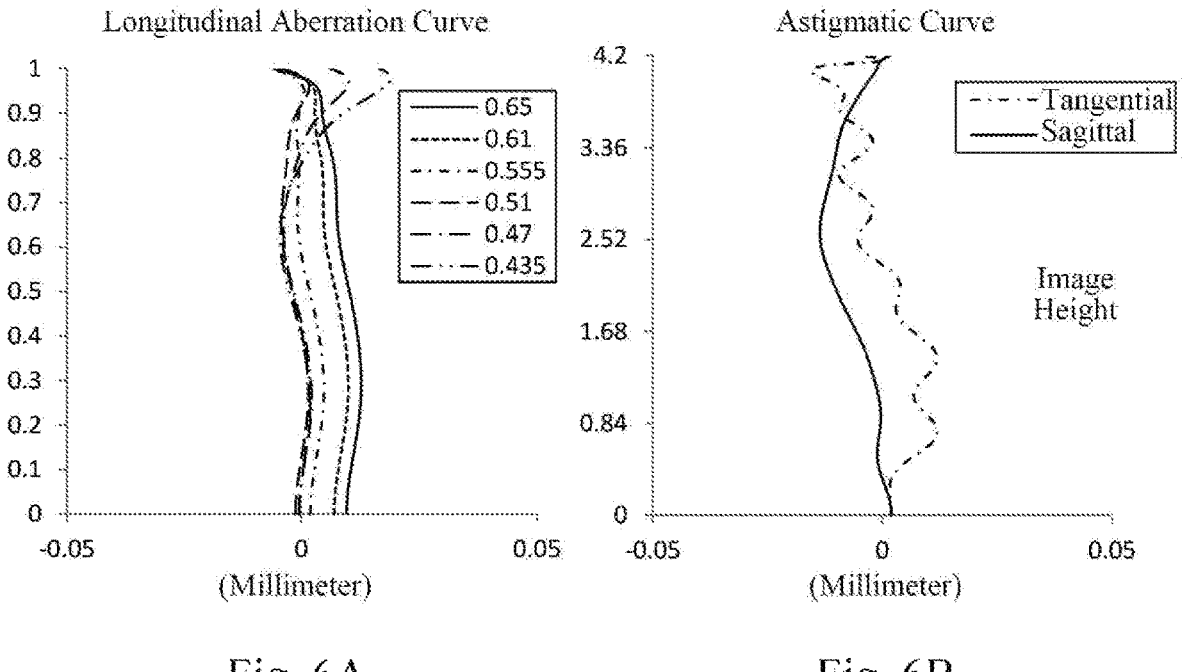
Fig. 6A                    Fig. 6B

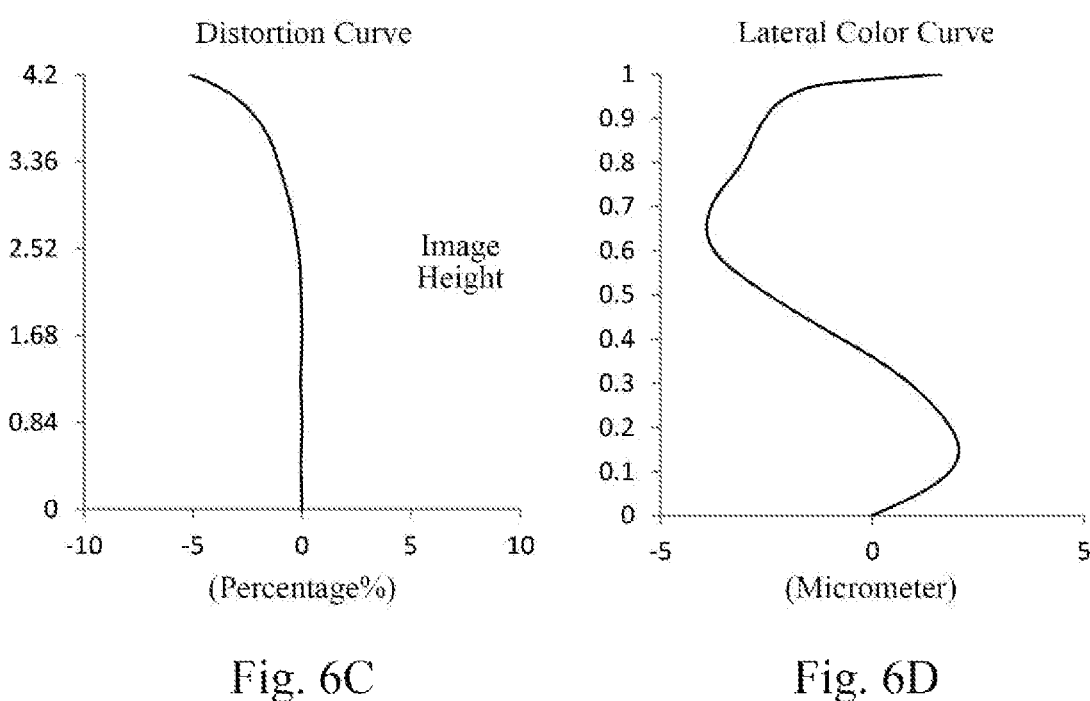
Fig. 6C                     Fig. 6D
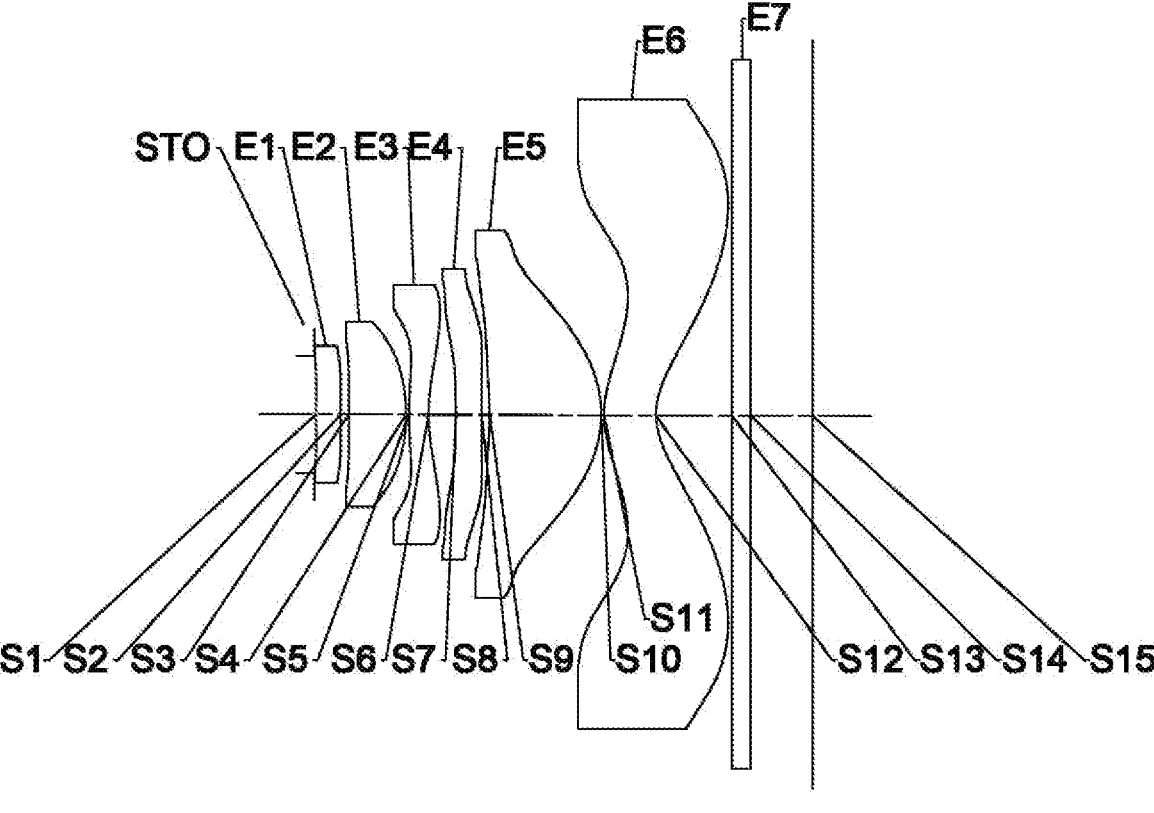
Fig. 7

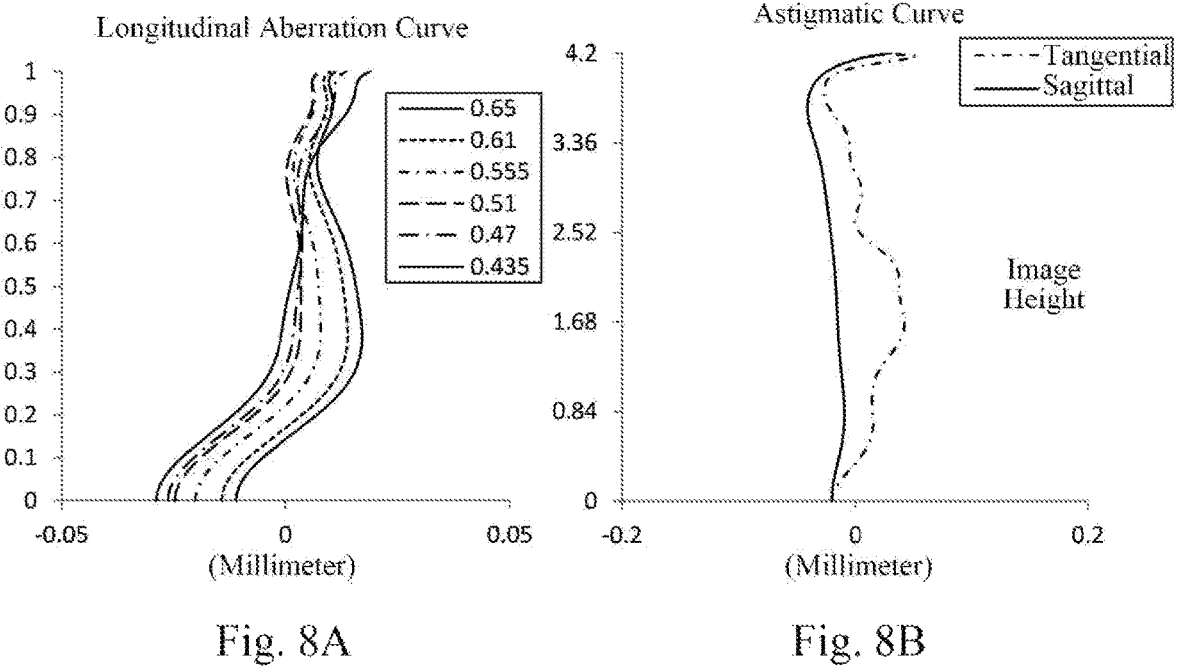
Fig. 8A
Fig. 8B
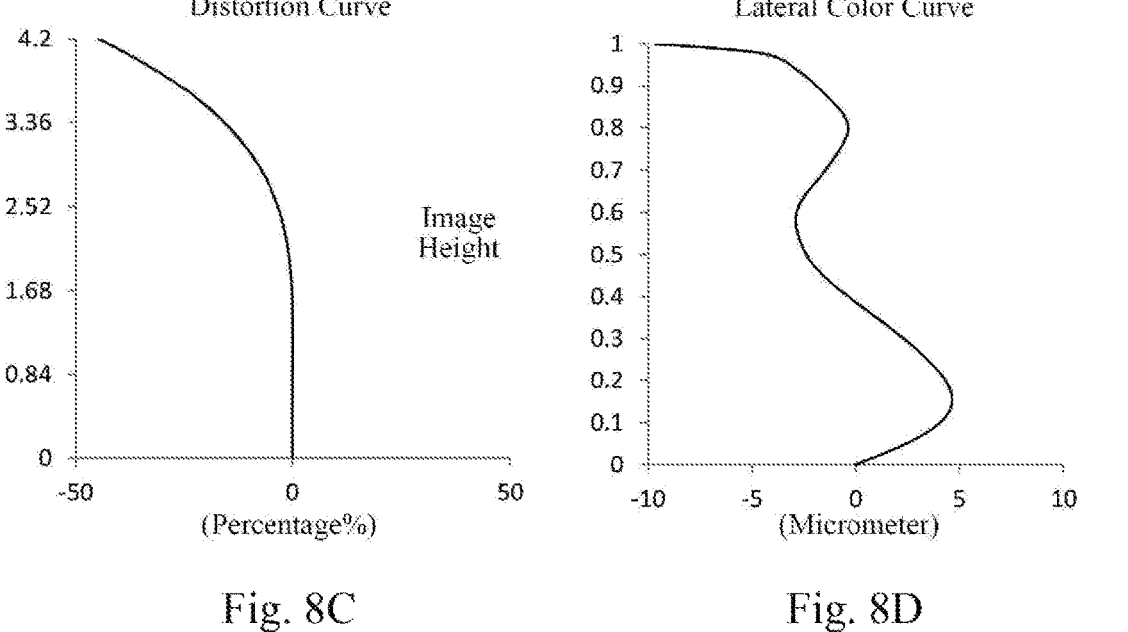
Fig. 8C
Fig. 8D

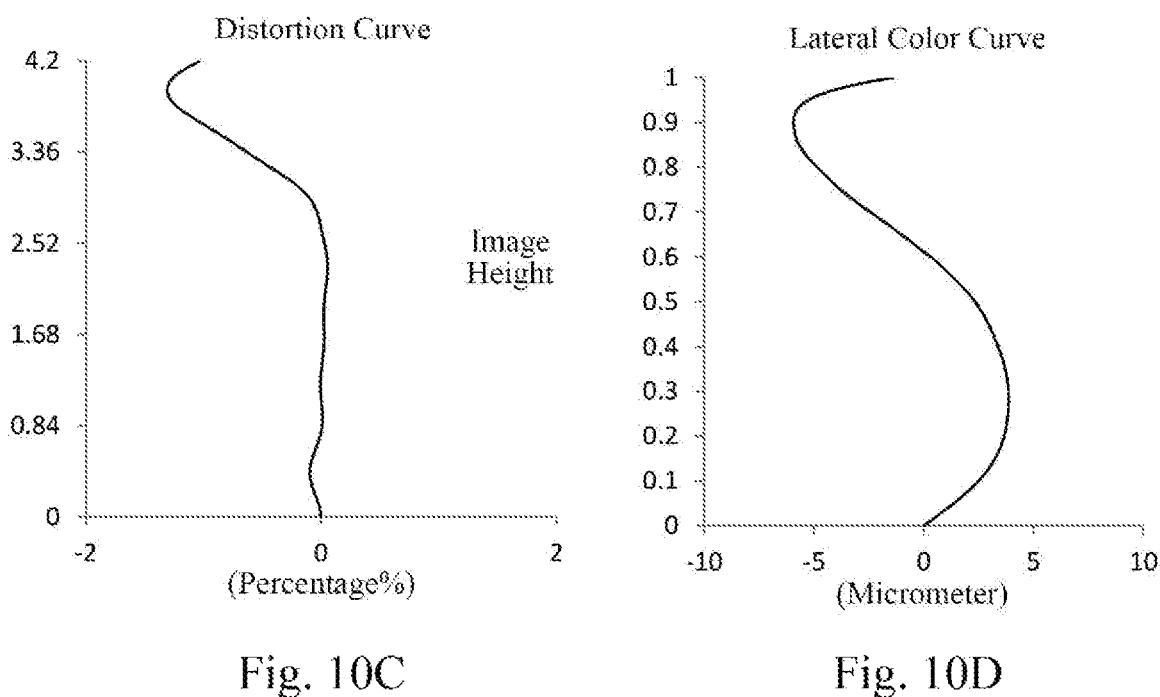
Fig. 10C
Fig. 10D
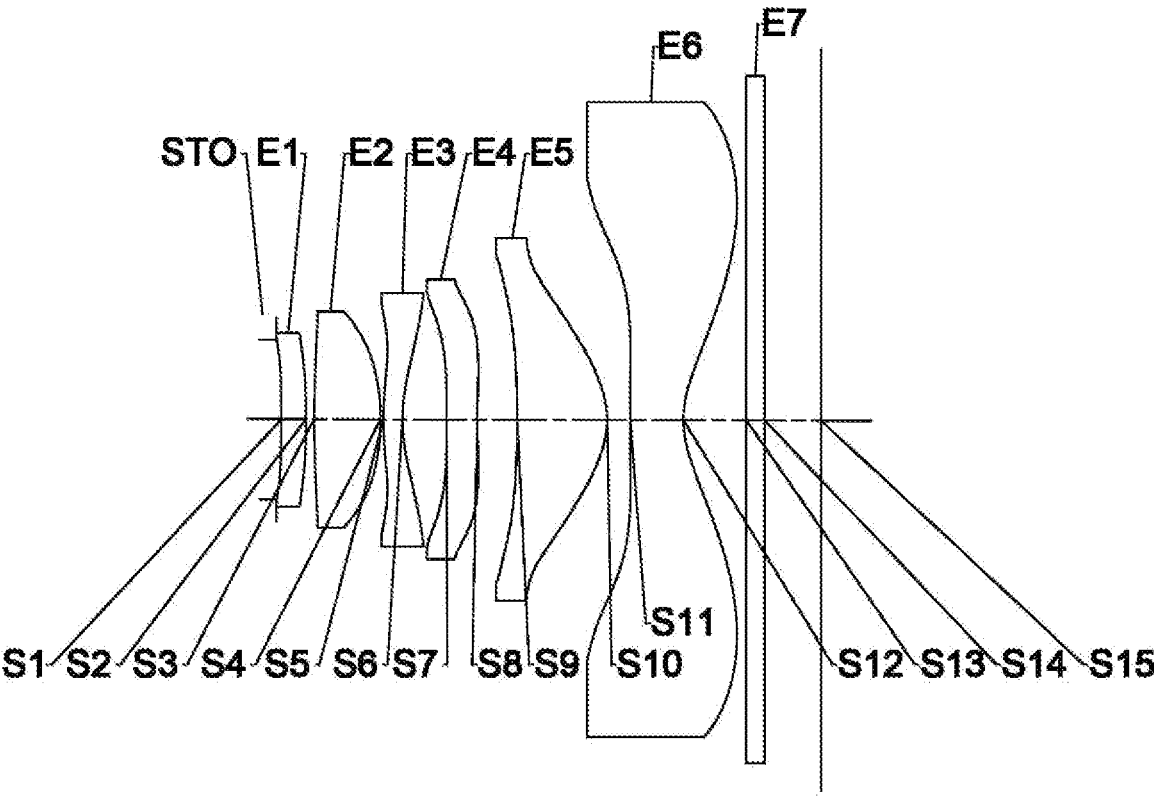
Fig. 11

CAMERA LENS ASSEMBLY INCLUDING SIX LENSES OF −+−++−, ++−−+− and ++−++− REFRACTIVE POWERS

CROSS-REFERENCE TO RELATED APPLICATION

This application claims benefit of priority to Chinese Patent Application No. 202010349042.1 filed on Apr. 28, 2020 before the China National Intellectual Property Administration, the entire disclosure of which is incorporated herein by reference in its entity.

TECHNICAL FIELD

The present disclosure relates to the field of optical elements, and specifically, relates to a camera lens assembly.

BACKGROUND

In recent years, the manufacturing technology and functional development of the portable electronic devices have been changing rapidly. At present, compared with the traditional cameras, the advantages of the mobile phone camera lens groups are becoming more and more obvious. Portable devices, such as mobile phones, are usually provided with a camera lens group, so that the mobile phone has a camera function.

The camera lens group is usually provided with a Charge-Coupled Device (CCD) type image sensor or a Complementary Metal-Oxide Semiconductor (CMOS) type image sensor, and provided with a camera lens assembly. The camera lens assembly may collect the light from the object side, and the imaging light travels along the optical path of the camera lens assembly and irradiates the image sensor. The image sensor converts the light signal into an electrical signal to form the image data. In order to improve the image quality in all aspects, the mainstream camera lens group usually adopts the form of an ultra-thin large imaging plane lens, a telephoto lens combined with a wide-angle lens.

In order to meet the requirements of miniaturization and imaging requirements, a camera lens assembly that can simultaneously satisfy the characteristics of miniaturization, wide-angle and good image quality is required.

SUMMARY

The present disclosure provides a camera lens assembly that is applicable to portable electronic products and at least solves or partially solves at least one of the above disadvantages of the prior art.

In one aspect, the present disclosure provides a camera lens assembly which includes, sequentially from an object side to an image side along an optical axis, a stop; a first lens having refractive power; a second lens having positive refractive power, a convex object-side surface and a convex image-side surface; a third lens having negative refractive power and a concave image-side surface; a fourth lens having refractive power; a fifth lens having refractive power and a convex image-side surface; and a sixth lens having negative refractive power and a concave image-side surface. A combined focal length f12 of the first lens and the second lens and half of a maximum field-of-view Semi-FOV of the camera lens assembly may satisfy: 1.00 mm<f12/tan(Semi-FOV)<4.50 mm. A maximum field-of-view FOV of the camera lens assembly satisfies: 91.0°<FOV.

In one embodiment, at least one of the object-side surface of the first lens to the image-side surface of the sixth lens is aspheric.

In one embodiment, a distance TTL along the optical axis from an object-side surface of the first lens to an imaging plane of the camera lens assembly and half of a diagonal length ImgH of an effective pixel area on the imaging plane may satisfy: TTL/ImgH≤1.61.

In one embodiment, a total effective focal length f of the camera lens assembly and an effective focal length f5 of the fifth lens may satisfy: 0.50<f/f5<3.00.

In one embodiment, a radius of curvature R6 of the image-side surface of the third lens and a radius of curvature R12 of the image-side surface of the sixth lens may satisfy: 2.00<(R6+R12)/(R6−R12)<4.50.

In one embodiment, an effective focal length f2 of the second lens and an optical back focus BFL of the camera lens assembly may satisfy: 1.00<f2/BFL<3.00.

In one embodiment, an effective focal length f3 of the third lens and a radius of curvature R10 of the image-side surface of the fifth lens may satisfy: 2.00<f3/R10<11.00.

In one embodiment, a combined focal length f45 of the fourth lens and the fifth lens and a combined focal length f56 of the fifth lens and the sixth lens may satisfy: 1.50<(f45+f56)/(f56−f45)<6.50.

In one embodiment, a center thickness CT2 of the second lens along the optical axis and a spaced interval T23 between the second lens and the third lens along the optical axis may satisfy: 14.00<CT2/T23<29.00.

In one embodiment, SAG51, being an on-axis distance from an intersection of an object-side surface of the fifth lens and the optical axis to a vertex of an effective radius of the object-side surface of the fifth lens, and SAG52, being an on-axis distance from an intersection of the image-side surface of the fifth lens and the optical axis to a vertex of an effective radius of the image-side surface of the fifth lens, may satisfy: 1.00<(SAG51+SAG52)/(SAG52−SAG51)<2.50.

In one embodiment, a maximum effective radius DT62 of the image-side surface of the sixth lens and a maximum effective radius DT11 of an object-side surface of the first lens may satisfy: 2.00<DT62/DT11<6.00.

In one embodiment, half of a diagonal length ImgH of an effective pixel area on an imaging plane of the camera lens assembly may satisfy: 4.10 mm≤ImgH.

In a second aspect, the present disclosure provides a camera lens assembly which includes, sequentially from an object side to an image side along an optical axis, a stop; a first lens having refractive power; a second lens having positive refractive power, a convex object-side surface and a convex image-side surface; a third lens having negative refractive power and a concave image-side surface; a fourth lens having refractive power; a fifth lens having refractive power and a convex image-side surface; and a sixth lens having negative refractive power and a concave image-side surface. An effective focal length f2 of the second lens and an optical back focus BFL of the camera lens assembly may satisfy: 1.00<f2/BFL<3.00. A maximum field-of-view FOV of the camera lens assembly satisfies: 91.0°<FOV.

In one embodiment, a distance TTL along the optical axis from an object-side surface of the first lens to an imaging plane of the camera lens assembly and half of a diagonal length ImgH of an effective pixel area on the imaging plane may satisfy: TTL/ImgH≤1.61.

In one embodiment, a total effective focal length f of the camera lens assembly and an effective focal length f5 of the fifth lens satisfy: 0.50<f/f5<3.00.

In one embodiment, a radius of curvature R6 of the image-side surface of the third lens and a radius of curvature R12 of the image-side surface of the sixth lens may satisfy: $2.00<(R6+R12)/(R6-R12)<4.50$.

In one embodiment, a combined focal length f12 of the first lens and the second lens and half of a maximum field-of-view Semi-FOV of the camera lens assembly may satisfy: $1.00 \text{ mm}<f12/\tan(\text{Semi-FOV})<4.50 \text{ mm}$.

In one embodiment, an effective focal length f3 of the third lens and a radius of curvature R10 of the image-side surface of the fifth lens may satisfy: $2.00<f3/R10<11.00$.

In one embodiment, a combined focal length f45 of the fourth lens and the fifth lens and a combined focal length f56 of the fifth lens and the sixth lens may satisfy: $1.50<(f45+f56)/(f56-f45)<6.50$.

In one embodiment, a center thickness CT2 of the second lens along the optical axis and a spaced interval T23 between the second lens and the third lens along the optical axis may satisfy: $14.00<CT2/T23<29.00$.

In one embodiment, SAG51, being an on-axis distance from an intersection of an object-side surface of the fifth lens and the optical axis to a vertex of an effective radius of the object-side surface of the fifth lens, and SAG52, being an on-axis distance from an intersection of the image-side surface of the fifth lens and the optical axis to a vertex of an effective radius of the image-side surface of the fifth lens, may satisfy: $1.00<(SAG51+SAG52)/(SAG52-SAG51)<2.50$.

In one embodiment, a maximum effective radius DT62 of the image-side surface of the sixth lens and a maximum effective radius DT11 of an object-side surface of the first lens may satisfy: $2.00<DT62/DT11<6.00$.

In one embodiment, half of a diagonal length ImgH of an effective pixel area on an imaging plane of the camera lens assembly may satisfy: $4.10 \text{ mm} \le ImgH$.

The present disclosure discloses a camera lens assembly with six lenses. The camera lens assembly has at least one beneficial effect, such as miniaturization, wide-angle, and good image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of a camera lens assembly according to example 1 of the present disclosure; and FIGS. 2A to 2D illustrate a longitudinal aberration curve, an astigmatic curve, a distortion curve, and a lateral color curve of the camera lens assembly of the example 1, respectively.

FIG. 5 illustrates a schematic structural view of a camera lens assembly according to example 3 of the present disclosure; and FIGS. 6A to 6D illustrate a longitudinal aberration curve, an astigmatic curve, a distortion curve, and a lateral color curve of the camera lens assembly of the example 3, respectively.

FIG. 7 illustrates a schematic structural view of a camera lens assembly according to example 4 of the present disclosure; and FIGS. 8A to 8D illustrate a longitudinal aberration curve, an astigmatic curve, a distortion curve, and a lateral color curve of the camera lens assembly of the example 4, respectively.

FIGS. 10A to 10D illustrate a longitudinal aberration curve, an astigmatic curve, a distortion curve, and a lateral color curve of the camera lens assembly of the example 5, respectively.

FIG. 11 illustrates a schematic structural view of a camera lens assembly according to example 6 of the present disclosure.

DETAILED DESCRIPTION OF EMBODIMENTS

Figures 2C, 2D:
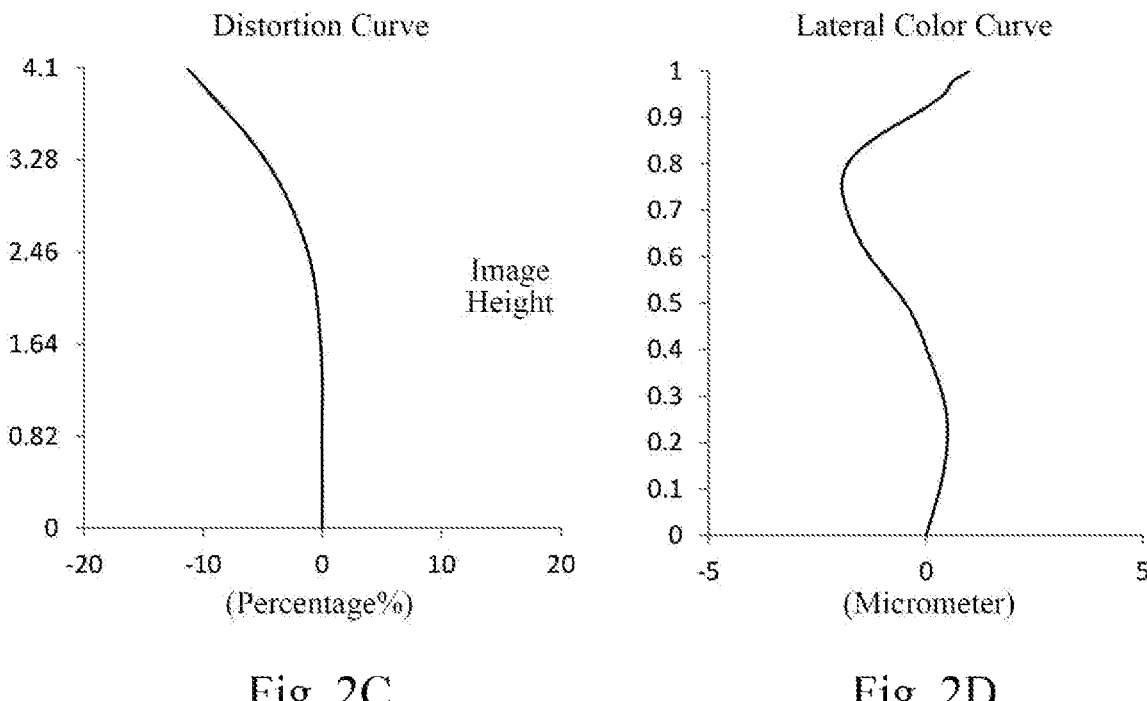

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens assembly according to an exemplary embodiment of the present disclosure may include, for example, six lenses having refractive power, that is, a first lens, a second lens, a third lens, a fourth lens, a fifth lens and a sixth lens. The six lenses are arranged sequentially from an object side to an image side along an optical axis. Among the first lens to the sixth lens, there may be an air interval between each two adjacent lenses.

In an exemplary embodiment, the above camera lens assembly may further include at least one stop. The stop may be disposed at an appropriate position as required, for example, between the object side and the first lens. Optionally, the above camera lens assembly may further include an optical filter for correcting the color deviation and/or a protective glass for protecting the photosensitive element located on an imaging plane.

In an exemplary embodiment, the first lens has positive or negative refractive power; the second lens has positive refractive power, an object-side surface thereof may be convex, and an image-side surface thereof may be convex; the third lens may have negative refractive power, and an image-side surface thereof is concave; the fourth lens has positive or negative refractive power; the fifth lens has positive or negative refractive power, and an image-side surface thereof is convex; and the sixth lens may have negative refractive power, and an image-side surface thereof is concave. By configuring the second lens to have positive refractive power, it is beneficial for the camera lens assembly to have a large field-of-view, and at the same time, the light may be better converged on the image-side surface of the second lens. Configuring the third lens to have negative refractive power may make the camera lens assembly have a larger imaging plane, that is, a higher imaging plane may be obtained at the same field-of-view, thereby making the image clearer. By configuring the fourth lens to have refractive power, it is beneficial to enable the central light to be better converged on the image-side surface of the fourth lens, and to diverge the edge light, which in turn enable the camera lens assembly to have a larger imaging plane.

The camera lens assembly provided by the present disclosure has the characteristics of large field-of-view and long depth of field. The camera lens assembly provided by the present disclosure may easily give the photographer a sense of perspective, and may enhance the appeal of the picture, so that the photographer has an immersive feeling.

In an exemplary embodiment, the camera lens assembly according to the present disclosure may satisfy: 1.00 mm<f12/tan(Semi-FOV)<4.50 mm, where f12 is a combined focal length of the first lens and the second lens, and Semi-FOV is half of a maximum field-of-view of the camera lens assembly. By controlling the conditional expression, it is beneficial to enhance the advantages of the wide-angle lens assembly and make the lens assembly have a wider imaging range. More specifically, f12 and Semi-FOV may satisfy: 1.20 mm<f12/tan(Semi-FOV)<4.10 mm.

In an exemplary embodiment, the camera lens assembly according to the present disclosure may satisfy: TTL/ImgH≤1.61, where TTL is a distance along the optical axis from an object-side surface of the first lens to an imaging plane of the camera lens assembly, and ImgH is half of a diagonal length of an effective pixel area on the imaging plane. By controlling the ratio of the total optical length to the image height, the overall size of the camera lens assembly may be effectively shortened, so that the camera lens assembly may better match the thinning of various electronic devices. Camera lens assembly with smaller size may be used in more electronic devices and are beneficial to the miniaturization of electronic devices. It may also make the camera lens assembly have better image quality, and the camera lens assembly may have a wider imaging range in the same size. In addition, it is also beneficial to increase the depth of field of the camera lens assembly, so that the camera lens assembly has a stronger sense of perspective. More specifically, TTL and ImgH may satisfy: 1.30<TTL/ImgH≤1.61.

In an exemplary embodiment, the camera lens assembly according to the present disclosure may satisfy: 0.50<f/f5<3.00, where f is a total effective focal length of the camera lens assembly, and f5 is an effective focal length of the fifth lens. By controlling the ratio of the total effective focal length to the effective focal length of the fifth lens in this range, it is possible to avoid the difficulty in processing the shape of the fifth lens due to the fifth lens taking on too much light convergence function, and also avoid the poor imaging effect caused by the short depth of field of the camera lens assembly. More specifically, f and f5 may satisfy: 0.90<f/f5<2.60.

In an exemplary embodiment, the camera lens assembly according to the present disclosure may satisfy: 2.00<(R6+R12)/(R6−R12)<4.50, where R6 is a radius of curvature of the image-side surface of the third lens, and R12 is a radius of curvature of the image-side surface of the sixth lens. By configuring the radius of curvature of the image-side surface of the third lens and the radius of curvature of the image-side surface of the sixth lens to satisfy the above expression, the processing difficulties caused by the excessive bending of the third lens and the sixth lens may be avoided, and the camera lens assembly may have a better ability to compensate chromatic aberration and distortion. More specifically, R6 and R12 satisfy: 2.05<(R6+R12)/(R6−R12)<4.10.

In an exemplary embodiment, the camera lens assembly according to the present disclosure may satisfy: 1.00<f2/BFL<3.00, where f2 is an effective focal length of the second lens, and BFL is an optical back focus of the camera lens assembly. In other words, BFL is a distance along the optical axis from the image-side surface of the sixth lens to an imaging plane of the camera lens assembly. By controlling the ratio of the effective focal length of the second lens to the optical back focus to satisfy this range, the structure of the camera lens assembly may be more reasonable, and the center light may be more converged to improve the sharpness. In addition, the edge light may cover a larger imaging plane, which effectively takes advantage of the wide-angle lens assembly. More specifically, f2 and BFL may satisfy: $1.70 < f2/BFL < 2.90$.

In an exemplary embodiment, the camera lens assembly according to the present disclosure may satisfy: $2.00 < f3/R10 < 11.00$, where f3 is an effective focal length of the third lens, and R10 is a radius of curvature of the image-side surface of the fifth lens. By controlling this conditional expression, it is beneficial to avoid the value of R10 from being too small, thereby avoiding the problem of difficulty in processing the fifth lens. At the same time, it also avoids the value of R10 being too large, thereby avoiding the problem of poor image quality due to the camera lens assembly not having a large field-of-view. More specifically, f3 and R10 may satisfy: $2.80 < f3/R10 < 10.30$.

In an exemplary embodiment, the camera lens assembly according to the present disclosure may satisfy: $1.50 < (f45+f56)/(f56-f45) < 6.50$, where f45 is a combined focal length of the fourth lens and the fifth lens, and f56 is a combined focal length of the fifth lens and the sixth lens. By controlling this conditional expression, it is beneficial to reasonably assign the refractive power of each lens, thereby reducing the processing difficulty of the lenses, so as to reduce the influence of processing error on the imaging quality, and make full use of each lens. More specifically, f45 and f56 may satisfy: $1.90 < (f45+f56)/(f56-f45) < 6.15$.

In an exemplary embodiment, the camera lens assembly according to the present disclosure may satisfy: $14.00 < CT2/T23 < 29.00$, where CT2 is a center thickness of the second lens along the optical axis, and T23 is a spaced interval between the second lens and the third lens along the optical axis. By controlling the ratio of the center thickness of the second lens to the air interval on the image side of the second lens, it is beneficial to avoid ghost images generated between the second lens and the third lens, so that the camera lens assembly has better spherical aberration correction and distortion correction functions.

In an exemplary embodiment, the camera lens assembly according to the present disclosure may satisfy: $1.00 < (SAG51+SAG52)/(SAG52-SAG51) < 2.50$, where SAG51 is an on-axis distance from an intersection of an object-side surface of the fifth lens and the optical axis to a vertex of an effective radius of the object-side surface of the fifth lens, and SAG52 is an on-axis distance from an intersection of the image-side surface of the fifth lens and the optical axis to a vertex of an effective radius of the image-side surface of the fifth lens. By controlling the ratio of the sagittal heights of the two surfaces of the fifth lens, it is beneficial to avoid excessive bending of the fifth lens to reduce the difficulty of processing the fifth lens. At the same time, by doing so, the assembly process of the camera lens assembly is more stable, and the assembly deformation of the camera lens assembly is reduced. More specifically, SAG51 and SAG52 may satisfy: $1.10 < (SAG51+SAG52)/(SAG52-SAG51) < 2.10$.

In an exemplary embodiment, the camera lens assembly according to the present disclosure may satisfy: $2.00 < DT62/DT11 < 6.00$, where DT62 is a maximum effective radius of the image-side surface of the sixth lens, and DT11 is a maximum effective radius of an object-side surface of the first lens. By controlling the ratio of the aperture of the sixth lens to the aperture of the first lens in this range, it is beneficial to avoid the oversize of the camera lens assembly caused by the excessively large aperture of the sixth lens. At the same time, it is beneficial to make the assembly process of the camera lens assembly more stable. More specifically, DT62 and DT11 may satisfy: $2.50 < DT62/DT11 < 5.40$.

In an exemplary embodiment, the camera lens assembly according to the present disclosure may satisfy: $91.0° < FOV$, where FOV is a maximum field-of-view of the camera lens assembly. The camera lens assembly provided by the present disclosure has a large field-of-view. The camera lens assembly may receive images in a wide range of angles, and may avoid the problem of incomplete photography due to geographical restrictions. When the camera lens assembly is used, the range of the scene observed from a certain point of view is much wider than that of the human eye at the same point of view. In addition, the camera lens assembly has a long depth of field, which may present a considerable range of clear images to bring a better photo experience.

In an exemplary embodiment, the camera lens assembly according to the present disclosure may satisfy: $4.10$ mm≤ImgH, where ImgH is half of a diagonal length of an effective pixel area on an imaging plane of the camera lens assembly. The camera lens assembly provided by the present disclosure has a large imaging plane, and the large imaging plane is beneficial to improve the quality of shooting, so as to make the images being clearer. More specifically, ImgH satisfies: $4.10$ mm≤ImgH≤$4.30$ mm.

The camera lens assembly according to the above embodiments of the present disclosure may employ a plurality of lenses, such as six lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the camera lens assembly is more advantageous for production processing and may be applied to portable electronic products. At the same time, the camera lens assembly of the present disclosure also has excellent optical performance, such as large imaging plane, large viewing angle, high resolution, and good shooting effect.

In the embodiments of the present disclosure, at least one of the surfaces of lenses is aspheric, that is, at least one of the object-side surface of the first lens to the image-side surface of the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens and the sixth lens is aspheric. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the camera lens assembly may be varied to achieve the various results and advantages described in this specification without departing from the technical solution claimed by the present disclosure. For example, although the embodiment is described by taking six lenses as an example, the camera lens assembly is not limited to include six lenses. The camera lens assembly may also include other numbers of lenses if desired.

Some specific examples of a camera lens assembly applicable to the above embodiment will be further described below with reference to the accompanying drawings.

Example 1

A camera lens assembly according to example 1 of the present disclosure is described below with reference to FIG. 1 to FIG. 2D. FIG. 1 shows a schematic structural view of the camera lens assembly according to example 1 of the present disclosure.

As shown in FIG. 1, the camera lens assembly includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is concave, and an image-side surface S12 thereof is concave. The optical filter E7 has an object-side surface S13 and an image-side surface S14. The camera lens assembly has an imaging plane S15, and the light from an object sequentially passes through the respective surfaces S1 to S14 and is finally imaged on the imaging plane S15.

Table 1 is a table illustrating basic parameters of the camera lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0381 | | | | |
| S1 | Aspheric | 6.2968 | 0.3075 | 1.65 | 21.5 | −9.35 | −24.6177 |
| S2 | Aspheric | 3.0478 | 0.0615 | | | | −0.1769 |
| S3 | Aspheric | 3.3925 | 0.8725 | 1.60 | 28.3 | 2.54 | −0.2603 |
| S4 | Aspheric | −2.5511 | 0.0606 | | | | 0.8459 |
| S5 | Aspheric | −29.4640 | 0.3785 | 1.67 | 19.2 | −3.98 | 48.7215 |
| S6 | Aspheric | 2.9804 | 0.1978 | | | | −2.1711 |
| S7 | Aspheric | 5.2675 | 0.8143 | 1.55 | 56.1 | 28.84 | 2.0642 |
| S8 | Aspheric | 7.4831 | 0.4559 | | | | −62.7260 |
| S9 | Aspheric | 9.5735 | 1.0732 | 1.55 | 56.1 | 2.34 | −85.1986 |
| S10 | Aspheric | −1.4130 | 0.4221 | | | | −1.0385 |
| S11 | Aspheric | −3105.8984 | 0.5000 | 1.57 | 37.3 | −2.27 | 99.0000 |
| S12 | Aspheric | 1.2951 | 0.6344 | | | | −1.0081 |
| S13 | Spherical | Infinite | 0.2961 | 1.52 | 64.2 | | |
| S14 | Spherical | Infinite | 0.5255 | | | | |
| S15 | Spherical | Infinite | | | | | |

In example 1, a total effective focal length f of the camera lens assembly is 4.12 mm, a distance TTL along the optical axis from the object-side surface S1 of the first lens E1 to the imaging surface S15 is 6.60 mm, and an aperture number Fno is 1.88.

In example 1, the object-side surface and the image-side surface of any one of the first lens E1 to the sixth lens E6 are aspheric. The surface shape x of each aspheric lens may be defined by using, but not limited to, the following aspheric formula:

$$x = \frac{ch^2}{1 + \sqrt{1 - (k+1)c^2 h^2}} + \sum A_i h^i \tag{1}$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S12 in example 1.

TABLE 2

| Surface number | A4 | A6 | A8 | A10 | A12 |
|---|---|---|---|---|---|
| S1 | −5.6199E−02 | 7.1312E−02 | −2.2479E−01 | 6.0028E−01 | −1.1139E+00 |
| S2 | −1.2774E−01 | 1.0619E−01 | −1.5408E−01 | 1.9666E−01 | −1.8540E−01 |
| S3 | −7.5395E−02 | 5.8508E−02 | −1.0037E−01 | 1.1098E−01 | −7.2708E−02 |
| S4 | 1.8247E−01 | −5.1644E−01 | 8.9416E−01 | −1.0586E+00 | 8.5469E−01 |
| S5 | 1.4466E−01 | −4.9182E−01 | 7.7918E−01 | −8.3415E−01 | 6.1596E−01 |
| S6 | −1.2534E−02 | −3.2285E−02 | 3.5881E−02 | −1.9099E−02 | 5.4554E−03 |
| S7 | −5.4640E−02 | 5.1234E−02 | −4.2807E−02 | 2.6052E−02 | −1.1587E−02 |
| S8 | −5.2059E−02 | 2.1216E−02 | −1.1121E−02 | 5.0522E−04 | 2.7865E−03 |
| S9 | −7.8349E−03 | 1.7260E−02 | −2.3156E−02 | 1.8756E−02 | −9.8636E−03 |
| S10 | 1.4033E−01 | −9.6530E−02 | 5.4651E−02 | −2.1301E−02 | 5.8006E−03 |
| S11 | 5.4391E−02 | −1.2510E−01 | 9.1230E−02 | −4.0310E−02 | 1.1293E−02 |
| S12 | −1.5062E−01 | 4.9222E−02 | −1.2253E−02 | 2.1511E−03 | −2.5991E−04 |

| Surface number | A14 | A16 | A18 | A20 |
|---|---|---|---|---|
| S1 | 1.3316E+00 | −9.7336E−01 | 3.9459E−01 | −6.7903E−02 |
| S2 | 1.3496E−01 | −6.9035E−02 | 2.1049E−02 | −2.8399E−03 |
| S3 | 3.0443E−02 | −7.3741E−03 | 7.3569E−04 | 1.2039E−05 |
| S4 | −4.5876E−01 | 1.5599E−01 | −3.0345E−02 | 2.5820E−03 |
| S5 | −3.0379E−01 | 9.4763E−02 | −1.6832E−02 | 1.2931E−03 |
| S6 | −4.7509E−04 | −1.9638E−04 | 6.6051E−05 | −6.4504E−06 |
| S7 | 3.5619E−03 | −7.0315E−04 | 8.3003E−05 | −4.7473E−06 |
| S8 | −1.8872E−03 | 6.1383E−04 | −1.0384E−04 | 7.3764E−06 |
| S9 | 3.2507E−03 | −6.5346E−04 | 7.4229E−05 | −3.6997E−06 |
| S10 | −1.1866E−03 | 1.8664E−04 | −1.9440E−05 | 9.2469E−07 |
| S11 | −1.9947E−03 | 2.1376E−04 | −1.2586E−05 | 3.0940E−07 |
| S12 | 2.1095E−05 | −1.1001E−06 | 3.3349E−08 | −4.4670E−10 |

FIG. 2A illustrates a longitudinal aberration curve of the camera lens assembly according to example 1, representing deviations of focal points converged by light of different wavelengths after passing through the system. FIG. 2B illustrates an astigmatic curve of the camera lens assembly according to example 1, representing a curvature of a tangential plane and a curvature of a sagittal plane. FIG. 2C illustrates a distortion curve of the camera lens assembly according to example 1, representing amounts of distortion corresponding to different image heights. FIG. 2D illustrates a lateral color curve of the camera lens assembly according to example 1, representing deviations of different image heights on an imaging plane after light passes through the system. It can be seen from FIG. 2A to FIG. 2D that the camera lens assembly provided in example 1 may achieve good image quality.

Example 2

Figure 3:
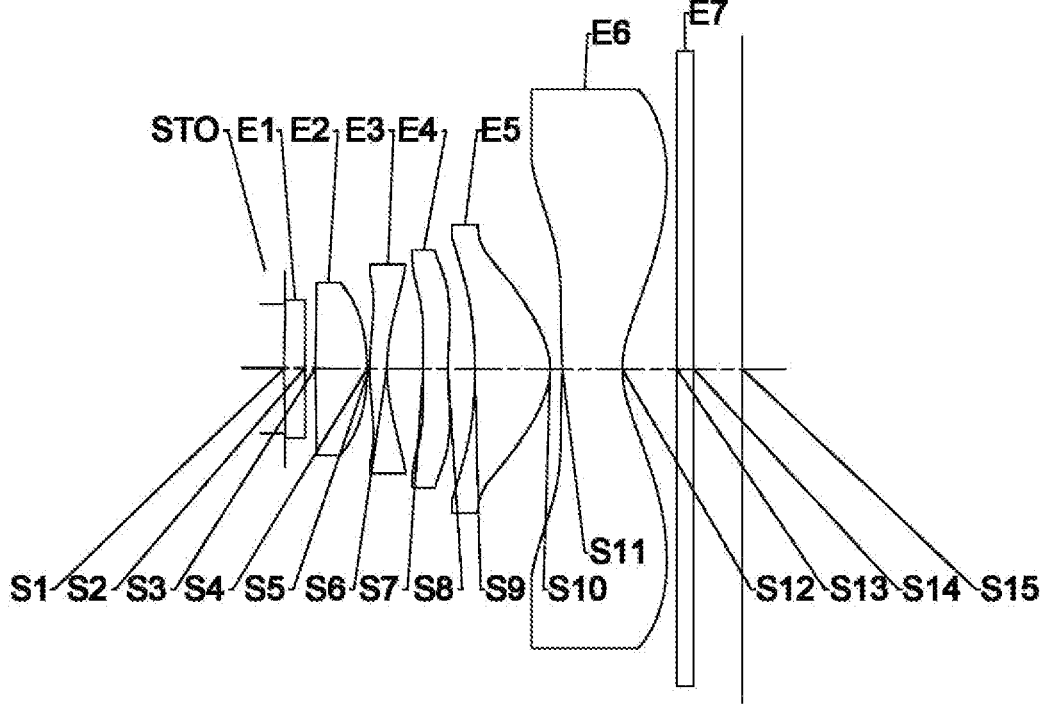
FIG. 3 illustrates a schematic structural view of a camera lens assembly according to example 2 of the present disclosure.

A camera lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens assembly according to example 2 of the present disclosure.

As shown in FIG. 3, the camera lens assembly includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is concave, and an image-side surface S12 thereof is concave. The optical filter E7 has an object-side surface S13 and an image-side surface S14. The camera lens assembly has an imaging plane S15, and the light from an object sequentially passes through the respective surfaces S1 to S14 and is finally imaged on the imaging plane S15.

In example 2, a total effective focal length f of the camera lens assembly is 3.83 mm, a distance TTL along the optical axis from the object-side surface S1 of the first lens E1 to the imaging surface S15 is 5.79 mm, and an aperture number Fno is 2.35.

Table 3 is a table illustrating basic parameters of the camera lens assembly of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Refractive index (Material) | Abbe number | Focal length | Conic coefficient |
|---|---|---|---|---|---|---|---|
| OBJ | Spherical | Infinite | Infinite | | | | |
| STO | Spherical | Infinite | −0.0133 | | | | |
| S1 | Aspheric | 7.0026 | 0.2647 | 1.62 | 23.5 | 35.55 | 0.0000 |
| S2 | Aspheric | 9.9343 | 0.1324 | | | | 0.0000 |
| S3 | Aspheric | 7.5561 | 0.6560 | 1.55 | 56.1 | 3.72 | 18.1199 |
| S4 | Aspheric | −2.6972 | 0.0332 | | | | 0.0000 |
| S5 | Aspheric | 3.6357 | 0.2150 | 1.67 | 20.4 | −7.96 | −1.8602 |
| S6 | Aspheric | 2.1061 | 0.4555 | | | | 0.0000 |
| S7 | Aspheric | 10.9773 | 0.3145 | 1.62 | 23.5 | −9.78 | −1.5441 |
| S8 | Aspheric | 3.9588 | 0.3388 | | | | 0.0000 |
| S9 | Aspheric | −7.8156 | 0.9587 | 1.55 | 56.1 | 1.52 | 0.0000 |
| S10 | Aspheric | −0.7804 | 0.1507 | | | | −0.9962 |
| S11 | Aspheric | −3.0632 | 0.7589 | 1.54 | 55.9 | −1.56 | 0.0000 |
| S12 | Aspheric | 1.2470 | 0.6886 | | | | −1.0000 |
| S13 | Spherical | Infinite | 0.2100 | 1.52 | 64.2 | | |
| S14 | Spherical | Infinite | 0.6156 | | | | |
| S15 | Spherical | Infinite | | | | | |

TABLE 4

| Surface number | A4 | A6 | A8 | A10 | A12 |
|---|---|---|---|---|---|
| S1 | −7.4924E−02 | 4.0305E−02 | −3.3108E−01 | 1.6188E+00 | −4.6007E+00 |
| S2 | −1.0774E−01 | 6.6961E−02 | −2.6468E−01 | 1.0665E+00 | −1.9932E+00 |
| S3 | −7.5333E−02 | −9.0227E−03 | −1.9485E−02 | 1.7261E−01 | −3.0379E−01 |
| S4 | −3.2952E−02 | −1.8090E−01 | 4.2357E−01 | −7.2774E−01 | 1.0059E+00 |
| S5 | −7.6768E−02 | −9.5599E−02 | 1.7179E−01 | −2.4169E−01 | 3.8388E−01 |
| S6 | −9.9436E−02 | 7.0550E−02 | −2.0434E−01 | 3.7430E−01 | −4.0056E−01 |
| S7 | −2.3534E−01 | 3.6506E−01 | −8.0798E−01 | 1.4037E+00 | −1.5979E+00 |
| S8 | −3.1690E−01 | 8.9919E−01 | −3.2771E+00 | 9.3333E+00 | −1.9639E+01 |
| S9 | −2.0469E−01 | 9.3552E−01 | −2.9804E+00 | 6.5467E+00 | −1.0104E+01 |
| S10 | 5.3651E−01 | −7.8323E−01 | 8.6829E−01 | −8.4857E−01 | 9.8353E−01 |
| S11 | 5.8008E−01 | −1.1325E+00 | 1.4579E+00 | −1.3233E+00 | 8.6133E−01 |
| S12 | −2.0977E−01 | 1.1642E−01 | −5.6127E−02 | 2.0523E−02 | −5.5160E−03 |

| Surface number | A14 | A16 | A18 | A20 |
|---|---|---|---|---|
| S1 | 7.9301E+00 | −7.8903E+00 | 4.0439E+00 | −7.7450E−01 |
| S2 | 1.7929E+00 | −1.4117E−01 | −8.7588E−01 | 4.2909E−01 |
| S3 | 3.3058E−01 | −2.4925E−01 | 1.3806E−01 | −3.8882E−02 |
| S4 | −1.0740E+00 | 7.5363E−01 | −2.7406E−01 | 1.7846E−02 |
| S5 | −4.7777E−01 | 3.5740E−01 | −1.4072E−01 | 2.2493E−02 |
| S6 | 2.5931E−01 | −9.9355E−02 | 2.0053E−02 | −1.2781E−03 |
| S7 | 1.1582E+00 | −5.1158E−01 | 1.2547E−01 | −1.3145E−02 |
| S8 | 3.0344E+01 | −3.4524E+01 | 2.8983E+01 | −1.7887E+01 |
| S9 | 1.1070E+01 | −8.6920E+00 | 4.9168E+00 | −1.9988E+00 |
| S10 | −1.2031E+00 | 1.1551E+00 | −7.8431E−01 | 3.7127E−01 |
| S11 | −4.0760E−01 | 1.4174E−01 | −3.6390E−02 | 6.8767E−03 |
| S12 | 1.0909E−03 | −1.6016E−04 | 1.7584E−05 | −1.4466E−06 |

Figures 4A, 4B, 4C, 4D:
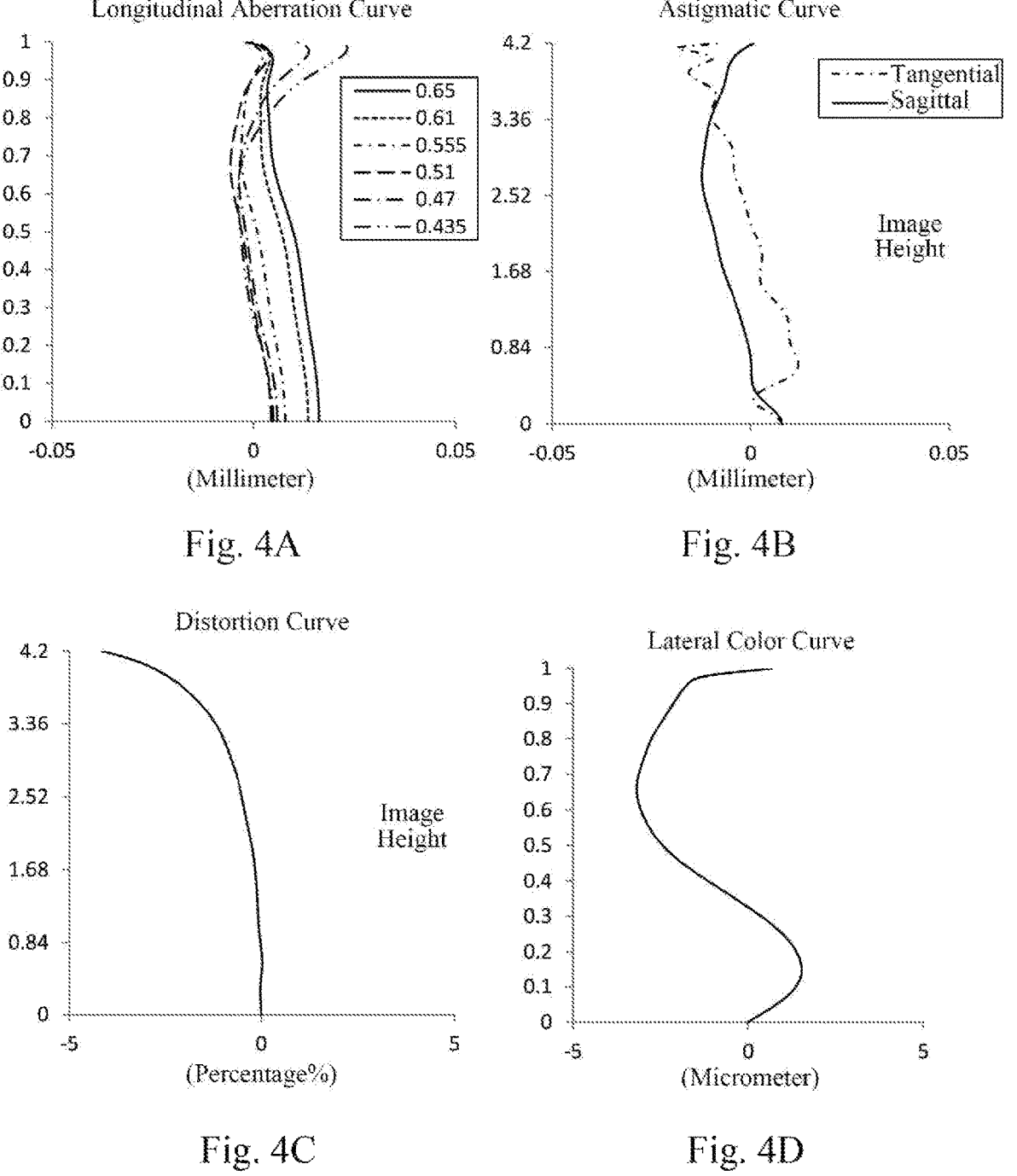
FIGS. 4A to 4D illustrate a longitudinal aberration curve, an astigmatic curve, a distortion curve, and a lateral color curve of the camera lens assembly of the example 2, respectively.

FIG. 4A illustrates a longitudinal aberration curve of the camera lens assembly according to example 2, representing deviations of focal points converged by light of different wavelengths after passing through the system. FIG. 4B illustrates an astigmatic curve of the camera lens assembly according to example 2, representing a curvature of a tangential plane and a curvature of a sagittal plane. FIG. 4C illustrates a distortion curve of the camera lens assembly according to example 2, representing amounts of distortion corresponding to different image heights. FIG. 4D illustrates a lateral color curve of the camera lens assembly according to example 2, representing deviations of different image heights on an imaging plane after light passes through the system. It can be seen from FIG. 4A to FIG. 4D that the camera lens assembly provided in example 2 may achieve good image quality.

Example 3

A camera lens assembly according to example 3 of the present disclosure is described below with reference to FIG. 5 to FIG. 6D. FIG. 5 shows a schematic structural view of the camera lens assembly according to example 3 of the present disclosure.

As shown in FIG. 5, the camera lens assembly includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. The camera lens assembly has an imaging plane S15, and the light from an object sequentially passes through the respective surfaces S1 to S14 and is finally imaged on the imaging plane S15.

In example 3, a total effective focal length f of the camera lens assembly is 3.77 mm, a distance TTL along the optical axis from the object-side surface S1 of the first lens E1 to the imaging surface S15 is 5.79 mm, and an aperture number Fno is 2.18.

Table 5 is a table illustrating basic parameters of the camera lens assembly of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Refractive index | Abbe number | Focal length | Conic coefficient |
|---|---|---|---|---|---|---|---|
| | | | | Material | | | |
| OBJ | Spherical | Infinite | Infinite | | | | |
| STO | Spherical | Infinite | 0.0035 | | | | |
| S1 | Aspheric | 7.4250 | 0.2739 | 1.62 | 23.5 | 39.74 | 0.0000 |
| S2 | Aspheric | 10.3044 | 0.0904 | | | | 0.0000 |
| S3 | Aspheric | 8.5597 | 0.6640 | 1.55 | 56.1 | 3.60 | 29.0242 |
| S4 | Aspheric | −2.4814 | 0.0300 | | | | 0.0000 |
| S5 | Aspheric | 3.5228 | 0.2222 | 1.67 | 20.4 | −7.08 | −1.6237 |
| S6 | Aspheric | 1.9657 | 0.4598 | | | | 0.0000 |
| S7 | Aspheric | 22.5623 | 0.2877 | 1.62 | 23.5 | −14.85 | 92.0382 |
| S8 | Aspheric | 6.6873 | 0.4063 | | | | 0.0000 |
| S9 | Aspheric | −3.6979 | 0.8636 | 1.55 | 56.1 | 3.44 | 0.0000 |
| S10 | Aspheric | −1.3480 | 0.0300 | | | | −1.0000 |
| S11 | Aspheric | 1.8712 | 0.8238 | 1.54 | 55.9 | −5.31 | −1.0000 |
| S12 | Aspheric | 0.9559 | 0.7502 | | | | −1.0000 |
| S13 | Spherical | Infinite | 0.2100 | 1.52 | 64.2 | | |
| S14 | Spherical | Infinite | 0.6782 | | | | |
| S15 | Spherical | Infinite | | | | | |

TABLE 6

| Surface number | A4 | A6 | A8 | A10 | A12 |
|---|---|---|---|---|---|
| S1 | −8.8676E−02 | 3.9644E−03 | −7.9707E−02 | 2.7444E−01 | −3.5543E−01 |
| S2 | −1.3490E−01 | 2.3389E−02 | −8.2445E−03 | −6.3499E−02 | 1.1094E+00 |
| S3 | −7.3490E−02 | −1.2847E−02 | −2.2935E−04 | 2.0685E−01 | −4.0856E−01 |
| S4 | 7.0982E−03 | −8.8363E−02 | 1.1298E−02 | 1.4711E−01 | −2.2715E−01 |
| S5 | −1.1953E−01 | 1.2207E−01 | −4.6224E−01 | 9.8963E−01 | −1.3310E+00 |
| S6 | −1.6435E−01 | 2.1369E−01 | −4.4652E−01 | 6.6617E−01 | −6.6930E−01 |
| S7 | −1.3147E−01 | −2.1520E−02 | 2.3341E−01 | −4.5892E−01 | 5.3806E−01 |
| S8 | −7.9413E−02 | −2.1628E−01 | 7.9449E−01 | −1.6221E+00 | 2.1023E+00 |
| S9 | 1.5820E−01 | −4.3109E−01 | 7.9345E−01 | −9.1416E−01 | 5.3293E−01 |
| S10 | −3.6501E−02 | 5.6980E−02 | 5.8383E−02 | −3.7612E−01 | 8.5162E−01 |
| S11 | −2.4543E−01 | 1.2406E−01 | 3.0558E−02 | −1.2188E−01 | 1.1350E−01 |
| S12 | −3.6978E−01 | 2.7748E−01 | −1.6959E−01 | 7.7475E−02 | −2.6163E−02 |

| Surface number | A14 | A16 | A18 | A20 |
|---|---|---|---|---|
| S1 | −1.7185E−01 | 1.1701E+00 | −1.3456E+00 | 5.1691E−01 |
| S2 | −3.3707E+00 | 4.8565E+00 | −3.4721E+00 | 9.9150E−01 |
| S3 | 3.8929E−01 | −1.8180E−01 | 2.7313E−02 | 5.1685E−03 |
| S4 | 1.0789E−01 | 5.2042E−02 | −7.5728E−02 | 2.5475E−02 |
| S5 | 1.1466E+00 | −6.0888E−01 | 1.8220E−01 | −2.3608E−02 |
| S6 | 4.4200E−01 | −1.8169E−01 | 4.1091E−02 | −3.3654E−03 |
| S7 | −3.9408E−01 | 1.7678E−01 | −4.3868E−02 | 4.5262E−03 |
| S8 | −1.5782E+00 | 2.1121E−01 | 9.8638E−01 | −1.2695E+00 |
| S9 | 1.3627E−01 | −5.9400E−01 | 6.1228E−01 | −3.7777E−01 |
| S10 | −1.1841E+00 | 1.1060E+00 | −7.1643E−01 | 3.2547E−01 |
| S11 | −6.2593E−02 | 2.3351E−02 | −6.1611E−03 | 1.1662E−03 |
| S12 | 6.5573E−03 | −1.2253E−03 | 1.7079E−04 | −1.7644E−05 |

FIG. 6A illustrates a longitudinal aberration curve of the camera lens assembly according to example 3, representing deviations of focal points converged by light of different wavelengths after passing through the system. FIG. 6B illustrates an astigmatic curve of the camera lens assembly according to example 3, representing a curvature of a tangential plane and a curvature of a sagittal plane. FIG. 6C illustrates a distortion curve of the camera lens assembly according to example 3, representing amounts of distortion corresponding to different image heights. FIG. 6D illustrates a lateral color curve of the camera lens assembly according to example 3, representing deviations of different image heights on an imaging plane after light passes through the system. It can be seen from FIG. 6A to FIG. 6D that the camera lens assembly provided in example 3 may achieve good image quality.

Example 4

A camera lens assembly according to example 4 of the present disclosure is described below with reference to FIG. 7 to FIG. 8D. FIG. 7 shows a schematic structural view of the camera lens assembly according to example 4 of the present disclosure.

As shown in FIG. 7, the camera lens assembly includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. The camera lens assembly has an imaging plane S15, and the light from an object sequentially passes through the respective surfaces S1 to S14 and is finally imaged on the imaging plane S15.

In example 4, a total effective focal length f of the camera lens assembly is 3.18 mm, a distance TTL along the optical axis from the object-side surface S1 of the first lens E1 to the imaging surface S15 is 5.59 mm, and an aperture number Fno is 2.40.

Table 7 is a table illustrating basic parameters of the camera lens assembly of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0181 | | | | |
| S1 | Aspheric | 20.7081 | 0.2785 | 1.62 | 23.5 | 181.38 | 0.0000 |
| S2 | Aspheric | 25.0328 | 0.0904 | | | | 0.0000 |
| S3 | Aspheric | 23.3024 | 0.6451 | 1.55 | 56.1 | 2.96 | −99.0000 |
| S4 | Aspheric | −1.7209 | 0.0300 | | | | 0.0000 |
| S5 | Aspheric | 4.9856 | 0.2200 | 1.67 | 20.4 | −6.06 | −14.6900 |
| S6 | Aspheric | 2.1928 | 0.3070 | | | | 0.0000 |
| S7 | Aspheric | −15.7791 | 0.2882 | 1.62 | 23.5 | 239.86 | −99.0000 |
| S8 | Aspheric | −14.4204 | 0.0912 | | | | 0.0000 |
| S9 | Aspheric | −2.4229 | 1.2594 | 1.55 | 56.1 | 3.89 | 0.0000 |
| S10 | Aspheric | −1.3389 | 0.0300 | | | | −1.0000 |
| S11 | Aspheric | 1.2327 | 0.5825 | 1.54 | 55.9 | −6.98 | −1.0000 |
| S12 | Aspheric | 0.7745 | 0.8563 | | | | −1.0000 |
| S13 | Spherical | Infinite | 0.2100 | 1.52 | 64.2 | | |
| S14 | Spherical | Infinite | 0.6970 | | | | |
| S15 | Spherical | Infinite | | | | | |

TABLE 8

| Surface number | A4 | A6 | A8 | A10 | A12 |
|---|---|---|---|---|---|
| S1 | −1.2182E−01 | 1.6751E−01 | −2.2294E+00 | 1.5720E+01 | −7.1480E+01 |
| S2 | −1.2705E−01 | −6.1822E−01 | 5.0964E+00 | −2.7801E+01 | 9.6612E+01 |
| S3 | −5.5339E−02 | −1.1165E−01 | −4.5523E−01 | 2.9600E+00 | −8.0328E+00 |
| S4 | 3.9683E−01 | −2.1894E+00 | 6.6509E+00 | −1.3814E+01 | 1.9466E+01 |
| S5 | 2.1550E−01 | −1.7873E+00 | 5.2530E+00 | −1.0928E+01 | 1.5513E+01 |
| S6 | −9.6311E−02 | −1.2456E−01 | 2.3514E−01 | −2.7171E−01 | 2.5678E−01 |
| S7 | 5.3791E−03 | −5.9291E−01 | 1.4515E+00 | −1.8959E+00 | 1.6131E+00 |
| S8 | 5.4520E−01 | −2.1848E+00 | 4.9652E+00 | −8.0822E+00 | 9.7678E+00 |
| S9 | 7.6027E−01 | −2.0569E+00 | 3.9491E+00 | −5.3876E+00 | 5.0274E+00 |
| S10 | −1.7267E−02 | 5.2404E−03 | 6.3014E−02 | −1.3982E−01 | 1.7940E−01 |

TABLE 8-continued

| S11 | −2.4199E−01 | 3.5646E−02 | 1.3022E−01 | −1.9793E−01 | 1.5545E−01 |
| S12 | −4.1690E−01 | 2.9342E−01 | −1.7672E−01 | 8.0495E−02 | −2.7020E−02 |

| Surface number | A14 | A16 | A18 | A20 |
|---|---|---|---|---|
| S1 | 2.1351E+02 | −4.0339E+02 | 4.3551E+02 | −2.0352E+02 |
| S2 | −2.0867E+02 | 2.7258E+02 | −1.9697E+02 | 6.0570E+01 |
| S3 | 1.3394E+01 | −1.3666E+01 | 7.8489E+00 | −1.9033E+00 |
| S4 | −1.8306E+01 | 1.1329E+01 | −4.6401E+00 | 1.2760E+00 |
| S5 | −1.4496E+01 | 8.4499E+00 | −2.7582E+00 | 3.8262E−01 |
| S6 | −1.8263E−01 | 8.4735E−02 | −2.2387E−02 | 2.6148E−03 |
| S7 | −9.0490E−02 | 3.1988E−01 | −6.4302E−02 | 5.5823E−03 |
| S8 | −8.9291E+00 | 6.2875E+00 | −3.4775E+00 | 1.5311E+00 |
| S9 | −2.8856E+00 | 5.5650E−01 | 5.9847E−01 | −6.3484E−01 |
| S10 | −1.6826E−01 | 1.2271E−01 | −6.8352E−02 | 2.8016E−02 |
| S11 | −7.9389E−02 | 2.8196E−02 | −7.1549E−03 | 1.3075E−03 |
| S12 | 6.6844E−03 | −1.2241E−03 | 1.6614E−04 | −1.6626E−05 |

FIG. 8A illustrates a longitudinal aberration curve of the camera lens assembly according to example 4, representing deviations of focal points converged by light of different wavelengths after passing through the system. FIG. 8B illustrates an astigmatic curve of the camera lens assembly according to example 4, representing a curvature of a tangential plane and a curvature of a sagittal plane. FIG. 8C illustrates a distortion curve of the camera lens assembly according to example 4, representing amounts of distortion corresponding to different image heights. FIG. 8D illustrates a lateral color curve of the camera lens assembly according to example 4, representing deviations of different image heights on an imaging plane after light passes through the system. It can be seen from FIG. 8A to FIG. 8D that the camera lens assembly provided in example 4 may achieve good image quality.

Example 5

Figure 9:
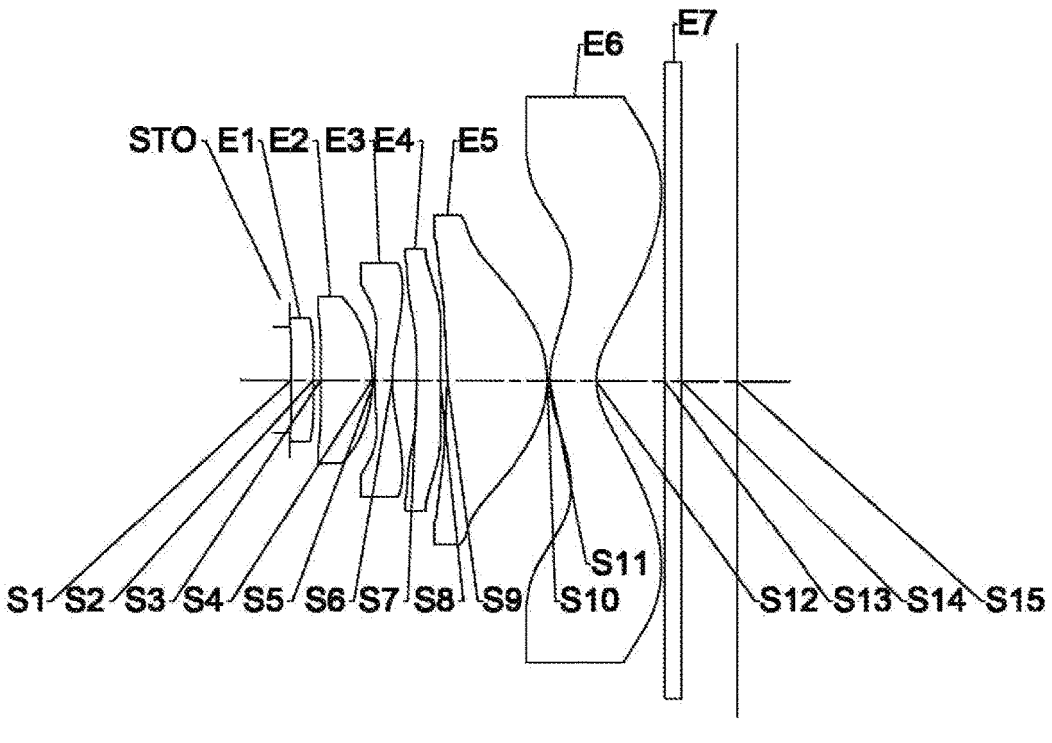
FIG. 9 illustrates a schematic structural view of a camera lens assembly according to example 5 of the present disclosure.

A camera lens assembly according to example 5 of the present disclosure is described below with reference to FIG. 9 to FIG. 10D. FIG. 9 shows a schematic structural view of the camera lens assembly according to example 5 of the present disclosure.

As shown in FIG. 9, the camera lens assembly includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The optical filter E7 has an object-side surface S13 and an image-side surface S14. The camera lens assembly has an imaging plane S15, and the light from an object sequentially passes through the respective surfaces S1 to S14 and is finally imaged on the imaging plane S15.

In example 5, a total effective focal length f of the camera lens assembly is 4.12 mm, a distance TTL along the optical axis from the object-side surface S1 of the first lens E1 to the imaging surface S15 is 6.57 mm, and an aperture number Fno is 1.52.

Table 9 is a table illustrating basic parameters of the camera lens assembly of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.1486 | | | | |
| S1 | Aspheric | 3.5333 | 0.3149 | 1.62 | 23.5 | 23.00 | 0.0000 |
| S2 | Aspheric | 4.4769 | 0.2096 | | | | 0.0000 |
| S3 | Aspheric | 8.1514 | 0.8665 | 1.55 | 56.1 | 4.80 | 7.1467 |
| S4 | Aspheric | −3.7193 | 0.0300 | | | | 0.0000 |
| S5 | Aspheric | 8.4054 | 0.2967 | 1.67 | 20.4 | −6.05 | −9.9491 |
| S6 | Aspheric | 2.6862 | 0.3245 | | | | 0.0000 |
| S7 | Aspheric | 3.2609 | 0.3924 | 1.62 | 23.5 | 33.94 | −6.8993 |
| S8 | Aspheric | 3.6512 | 0.4613 | | | | 0.0000 |
| S9 | Aspheric | −4.3675 | 1.0407 | 1.55 | 56.1 | 4.11 | 0.0000 |
| S10 | Aspheric | −1.6074 | 0.0300 | | | | −0.9845 |

TABLE 9-continued

| Surface number | Surface type | Radius of curvature | Thickness/ Distance | Material Refractive index | Abbe number | Focal length | Conic coefficient |
|---|---|---|---|---|---|---|---|
| S11 | Aspheric | 2.1776 | 0.9110 | 1.54 | 55.9 | −6.68 | −1.0000 |
| S12 | Aspheric | 1.1570 | 0.8019 | | | | −1.0000 |
| S13 | Spherical | Infinite | 0.2100 | 1.52 | 64.2 | | |
| S14 | Spherical | Infinite | 0.6785 | | | | |
| S15 | Spherical | Infinite | | | | | |

TABLE 10

| Surface number | A4 | A6 | A8 | A10 | A12 |
|---|---|---|---|---|---|
| S1 | −3.3462E−02 | 1.8801E−02 | −5.6519E−02 | 9.5002E−02 | −1.0701E−01 |
| S2 | −4.9719E−02 | 8.9107E−03 | −3.0018E−02 | 7.3345E−02 | −1.0423E−01 |
| S3 | −3.6044E−02 | 3.4320E−03 | 7.9922E−03 | −3.1140E−02 | 5.0959E−02 |
| S4 | 9.8377E−02 | −2.6415E−01 | 3.5723E−01 | −3.2349E−01 | 1.9812E−01 |
| S5 | 4.3292E−02 | −1.3124E−01 | 1.0347E−01 | −4.0879E−02 | −1.2434E−03 |
| S6 | −6.9123E−02 | 9.3023E−02 | −1.4961E−01 | 1.4398E−01 | −8.7577E−02 |
| S7 | −5.3468E−02 | 2.4483E−02 | 1.5944E−05 | −1.4602E−02 | 1.3507E−02 |
| S8 | −3.9770E−02 | −3.7795E−02 | 8.3372E−02 | −5.7824E−02 | −5.2260E−02 |
| S9 | 5.2711E−02 | 8.0795E−03 | −2.0125E−01 | 5.2979E−01 | −8.1071E−01 |
| S10 | −4.0234E−02 | 1.5050E−01 | −2.4212E−01 | 2.6600E−01 | −2.1316E−01 |
| S11 | −1.5210E−01 | 1.2734E−01 | −1.1307E−01 | 7.8543E−02 | −4.1253E−02 |
| S12 | −2.2237E−01 | 1.4076E−01 | −8.0843E−02 | 3.6084E−02 | −1.2017E−02 |

| Surface number | A14 | A16 | A18 | A20 |
|---|---|---|---|---|
| S1 | 7.8890E−02 | −3.6577E−02 | 9.7179E−03 | −1.1260E−03 |
| S2 | 9.0024E−02 | −4.5927E−02 | 1.2859E−02 | −1.5239E−03 |
| S3 | −4.2154E−02 | 1.9103E−02 | −4.4761E−03 | 4.2209E−04 |
| S4 | −8.0408E−02 | 2.0423E−02 | −2.8709E−03 | 1.5995E−04 |
| S5 | 8.8900E−03 | −3.9117E−03 | 7.6702E−04 | −6.0371E−05 |
| S6 | 3.3902E−02 | −8.0726E−03 | 1.0647E−03 | −5.5638E−05 |
| S7 | −6.3137E−03 | 1.6573E−03 | −2.2903E−04 | 1.2870E−05 |
| S8 | 1.5684E−01 | −1.7150E−01 | 1.1331E−01 | −4.9762E−02 |
| S9 | 8.3505E−01 | −6.0738E−01 | 3.1787E−01 | −1.2005E−01 |
| S10 | 1.2613E−01 | −5.4908E−02 | 1.7470E−02 | −4.0200E−03 |
| S11 | 1.6433E−02 | −4.9644E−03 | 1.1289E−03 | −1.9047E−04 |
| S12 | 2.9642E−03 | −5.4191E−04 | 7.3363E−05 | −7.3090E−06 |

Figures 10A, 10B:
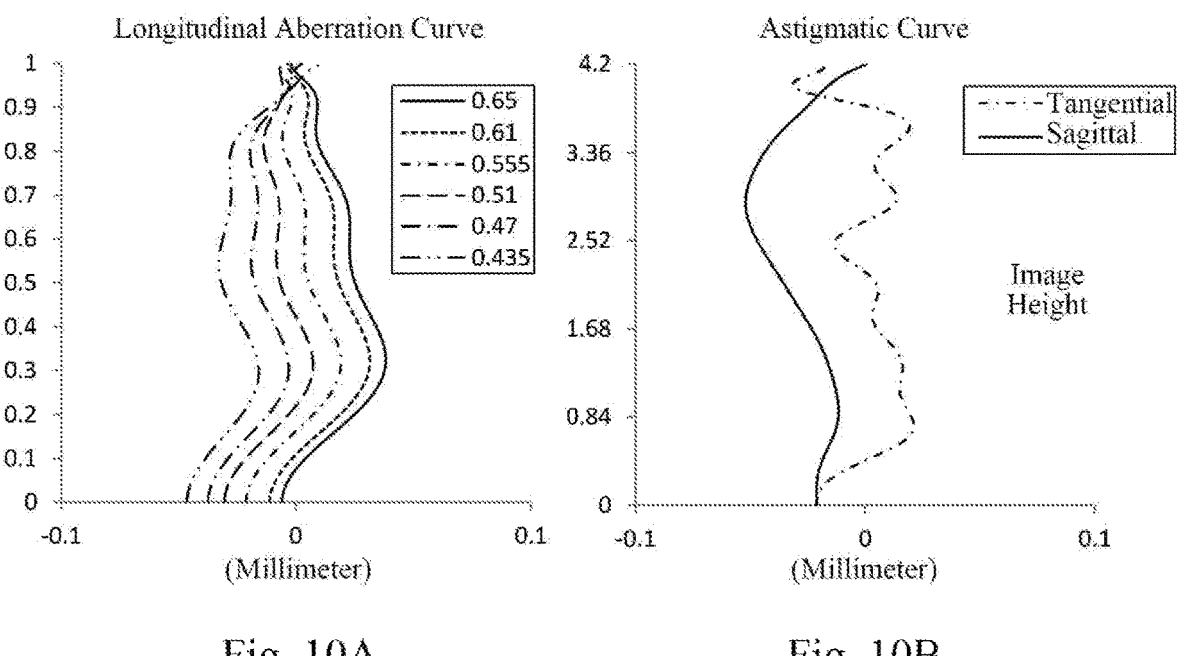

FIG. 10A illustrates a longitudinal aberration curve of the camera lens assembly according to example 5, representing deviations of focal points converged by light of different wavelengths after passing through the system. FIG. 10B illustrates an astigmatic curve of the camera lens assembly according to example 5, representing a curvature of a tangential plane and a curvature of a sagittal plane. FIG. 10C illustrates a distortion curve of the camera lens assembly according to example 5, representing amounts of distortion corresponding to different image heights. FIG. 10D illustrates a lateral color curve of the camera lens assembly according to example 5, representing deviations of different image heights on an imaging plane after light passes through the system. It can be seen from FIG. 10A to FIG. 10D that the camera lens assembly provided in example 5 may achieve good image quality.

Example 6

A camera lens assembly according to example 6 of the present disclosure is described below with reference to FIG. 11 to FIG. 12D. FIG. 11 shows a schematic structural view of the camera lens assembly according to example 6 of the present disclosure.

As shown in FIG. 11, the camera lens assembly includes a stop STO, a first lens E1, a second lens E2, a third lens E3, a fourth lens E4, a fifth lens E5, a sixth lens E6 and an optical filter E7, which are sequentially arranged from an object side to an image side along an optical axis.

The first lens E1 has positive refractive power, an object-side surface S1 thereof is concave, and an image-side surface S2 thereof is convex. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is concave, and an image-side surface S10 thereof is convex. The sixth lens E6 has negative refractive power, an object-side surface S11 thereof is concave, and an image-side surface S12 thereof is concave. The optical filter E7 has an object-side surface S13 and an image-side surface S14. The camera lens assembly has an imaging plane S15, and light from an object sequentially passes through the respective surfaces S1 to S14 and is finally imaged on the imaging plane S15.

In example 6, a total effective focal length f of the camera lens assembly is 4.05 mm, a distance TTL along the optical axis from the object-side surface S1 of the first lens E1 to the imaging surface S15 is 6.09 mm, and an aperture number Fno is 2.24.

Table 11 is a table illustrating basic parameters of the camera lens assembly of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

Figures 12A, 12B, 12C, 12D:
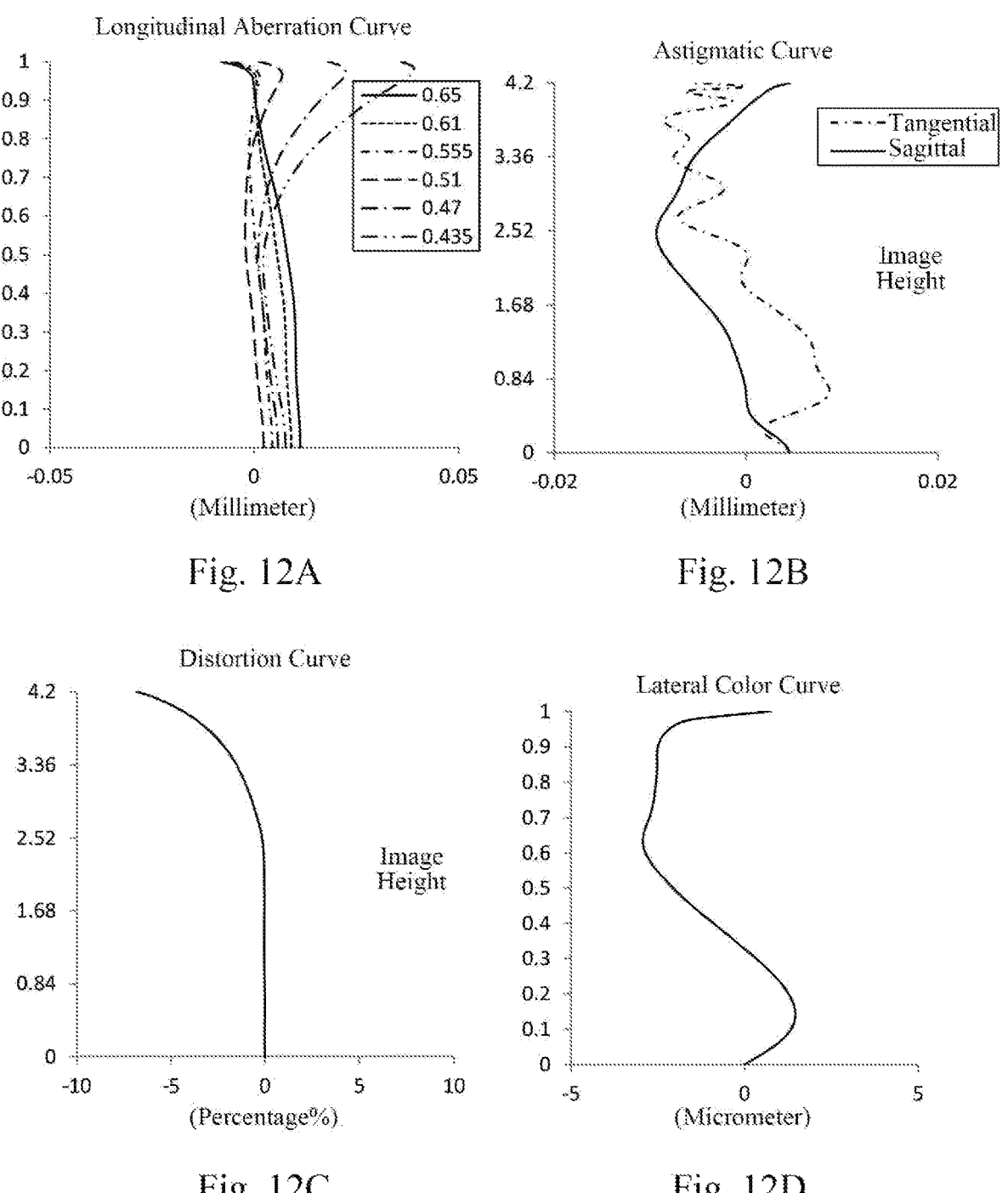
FIGS. 12A to 12D illustrate a longitudinal aberration curve, an astigmatic curve, a distortion curve, and a lateral color curve of the camera lens assembly of the example 6, respectively.

FIG. 12A illustrates a longitudinal aberration curve of the camera lens assembly according to example 6, representing deviations of focal points converged by light of different wavelengths after passing through the system. FIG. 12B illustrates an astigmatic curve of the camera lens assembly according to example 6, representing a curvature of a tangential plane and a curvature of a sagittal plane. FIG. 12C illustrates a distortion curve of the camera lens assembly according to example 6, representing amounts of distortion corresponding to different image heights. FIG. 12D illustrates a lateral color curve of the camera lens assembly according to example 6, representing deviations of different image heights on an imaging plane after light passes through

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.0557 | | | | |
| S1 | Aspheric | −982456.8642 | 0.2780 | 1.62 | 23.5 | 36.41 | 0.0000 |
| S2 | Aspheric | −23.4671 | 0.0904 | | | | 0.0000 |
| S3 | Aspheric | 8.1316 | 0.7528 | 1.55 | 56.1 | 3.70 | 13.9584 |
| S4 | Aspheric | −2.6035 | 0.0300 | | | | 0.0000 |
| S5 | Aspheric | 3.2317 | 0.2150 | 1.67 | 20.4 | −7.27 | −2.6966 |
| S6 | Aspheric | 1.8866 | 0.4986 | | | | 0.0000 |
| S7 | Aspheric | 38.0262 | 0.3427 | 1.62 | 23.5 | −11.57 | −82.0049 |
| S8 | Aspheric | 6.2140 | 0.4524 | | | | 0.0000 |
| S9 | Aspheric | −11.7571 | 1.0181 | 1.55 | 56.1 | 1.87 | 0.0000 |
| S10 | Aspheric | −0.9701 | 0.2607 | | | | −0.9703 |
| S11 | Aspheric | −11.7154 | 0.5971 | 1.54 | 55.9 | −1.90 | 0.0000 |
| S12 | Aspheric | 1.1378 | 0.7076 | | | | −1.0000 |
| S13 | Spherical | Infinite | 0.2100 | 1.52 | 64.2 | | |
| S14 | Spherical | Infinite | 0.6394 | | | | |
| S15 | Spherical | Infinite | | | | | |

35

TABLE 12

| Surface number | A4 | A6 | A8 | A10 | A12 |
|---|---|---|---|---|---|
| S1 | −9.1283E−02 | −2.8483E−02 | 3.3861E−01 | −1.6171E+00 | 4.8446E+00 |
| S2 | −1.3590E−01 | 7.6621E−02 | 3.1502E−02 | −2.2829E−01 | 8.7843E−01 |
| S3 | −6.7073E−02 | 4.1646E−02 | −1.5245E−02 | 9.9519E−02 | −3.0175E−01 |
| S4 | −7.0343E−03 | −1.0883E−01 | 1.5881E−01 | −1.7744E−01 | 1.7966E−01 |
| S5 | −1.3215E−01 | 6.0374E−02 | −2.3825E−01 | 5.4643E−01 | −7.1595E−01 |
| S6 | −1.6838E−01 | 1.6368E−01 | −3.4608E−01 | 5.5024E−01 | −5.7698E−01 |
| S7 | −1.4538E−01 | 9.0383E−02 | −6.0731E−02 | 7.0774E−02 | −1.0543E−01 |
| S8 | −1.5932E−01 | 1.8187E−01 | −6.0637E−01 | 1.9134E+00 | −4.3251E+00 |
| S9 | −3.4929E−02 | 1.8013E−01 | −6.3344E−01 | 1.3799E+00 | −2.0178E+00 |
| S10 | 3.2272E−01 | −3.8751E−01 | 3.2863E−01 | −1.2442E−01 | −6.4595E−02 |
| S11 | 2.5421E−01 | −5.6543E−01 | 7.2359E−01 | −6.3561E−01 | 3.9814E−01 |
| S12 | −2.4554E−01 | 1.3852E−01 | −6.4294E−02 | 2.1956E−02 | −5.2526E−03 |

| Surface number | A14 | A16 | A18 | A20 |
|---|---|---|---|---|
| S1 | −8.8524E+00 | 9.6834E+00 | −5.8200E+00 | 1.4763E+00 |
| S2 | −1.8649E+00 | 2.2049E+00 | −1.3517E+00 | 3.3570E−01 |
| S3 | 3.9381E−01 | −2.6508E−01 | 9.2093E−02 | −1.2974E−02 |
| S4 | −1.7691E−01 | 1.3197E−01 | −5.6713E−02 | 1.0268E−02 |
| S5 | 5.7762E−01 | −2.7829E−01 | 7.3158E−02 | −8.1001E−03 |
| S6 | 3.9002E−01 | −1.6293E−01 | 3.7555E−02 | −3.2505E−03 |
| S7 | 1.1005E−01 | −6.8879E−02 | 2.3218E−02 | −3.1926E−03 |
| S8 | 6.9198E+00 | −7.9757E+00 | 6.6918E+00 | −4.0882E+00 |
| S9 | 2.0743E+00 | −1.5382E+00 | 8.3261E−01 | −3.2928E−01 |
| S10 | 1.2293E−01 | −8.4955E−02 | 3.5490E−02 | −9.8997E−03 |
| S11 | −1.8135E−01 | 6.0737E−02 | −1.5017E−02 | 2.7308E−03 |
| S12 | 8.2851E−04 | −7.1574E−05 | −6.4810E−07 | 1.0740E−06 | the system. It can be seen from FIG. 12A to FIG. 12D that the camera lens assembly provided in example 6 may achieve good image quality.

In view of the above, examples 1 to 6 respectively satisfy the relationship shown in Table 13.

TABLE 13

| Condition | Example | | | | | |
|---|---|---|---|---|---|---|
| | 1 | 2 | 3 | 4 | 5 | 6 |
| f12/tan(Semi-FOV) (mm) | 3.02 | 3.01 | 2.87 | 1.23 | 4.08 | 3.05 |
| TTL/ImgH | 1.61 | 1.38 | 1.38 | 1.33 | 1.56 | 1.45 |
| f/f5 | 1.76 | 2.53 | 1.09 | 0.82 | 1.00 | 2.16 |
| (R6 + R12)/ (R6 - R12) | 2.54 | 3.90 | 2.89 | 2.09 | 2.51 | 4.04 |
| f2/BFL | 1.74 | 2.46 | 2.20 | 1.68 | 2.84 | 2.38 |
| f3/R10 | 2.81 | 10.20 | 5.25 | 4.53 | 3.76 | 7.49 |
| (f45 + f56)/ (f56 - f45) | 2.04 | 1.91 | 6.10 | 3.97 | 3.92 | 1.97 |
| CT2/T23 | 14.39 | 19.76 | 22.13 | 21.50 | 28.88 | 25.09 |
| (SAG51 + SAG52)/ (SAG52 - SAG51) | 1.16 | 1.89 | 2.01 | 1.35 | 1.80 | 1.70 |
| DT62/DT11 | 3.10 | 4.32 | 4.16 | 5.33 | 2.59 | 3.97 |
| FOV (°) | 96.6 | 97.9 | 99.3 | 134.4 | 91.5 | 96.2 |
| ImgH (mm) | 4.10 | 4.20 | 4.20 | 4.20 | 4.20 | 4.20 |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the camera lens assembly described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, sequentially from an object side to an image side of the camera lens assembly along an optical axis, comprising:

a stop;

a first lens having positive refractive power;

a second lens having positive refractive power, a convex object-side surface and a convex image-side surface;

a third lens having negative refractive power and a concave image-side surface;

a fourth lens having refractive power;

a fifth lens having refractive power and a convex image-side surface; and a sixth lens having negative refractive power and a concave image-side surface, wherein 3.01 mm<f12/tan(Semi-FOV)<4.50 mm, and 91.0°<FOV, where f12 is a combined focal length of the first lens and the second lens, Semi-FOV is half of a maximum field-of-view of the camera lens assembly, and FOV is a maximum field-of-view of the camera lens assembly, and FOV is a maximum field-of-view of the camera lens assembly, wherein 4.10 mm≤ImgH, where ImgH is half of a diagonal length of an effective pixel area on an imaging plane of the camera lens assembly, TTL/ImgH≤1.61, where TTL is a distance along the optical axis from an object-side surface of the first lens to an imaging plane of the camera lens assembly, and ImgH is half of a diagonal length of an effective pixel area on the imaging plane, wherein 2.51≤(R6+R12)/(R6−R12)<4.50, where R6 is a radius of curvature of the image-side surface of the third lens, and R12 is a radius of curvature of the image-side surface of the sixth lens, wherein 14.00<CT2/T23<29.00, where CT2 is a center thickness of the second lens along the optical axis, and T23 is a spaced interval between the second lens and the third lens along the optical axis, and the camera lens assembly comprises no more than six lenses.

2. The camera lens assembly according to claim 1, wherein 0.50<f/f5<3.00, where f is a total effective focal length of the camera lens assembly, and f5 is an effective focal length of the fifth lens.

3. The camera lens assembly according to claim 1, wherein 1.00<f2/BFL<3.00, where f2 is an effective focal length of the second lens, and BFL is an optical back focus of the camera lens assembly.

4. The camera lens assembly according to claim 1, wherein 2.00<f3/R10<11.00, where f3 is an effective focal length of the third lens, and R10 is a radius of curvature of the image-side surface of the fifth lens.

5. The camera lens assembly according to claim 1, wherein 1.50<(f45+f56)/(f56−f45)<6.50, where f45 is a combined focal length of the fourth lens and the fifth lens, and f56 is a combined focal length of the fifth lens and the sixth lens.

6. The camera lens assembly according to claim 1, wherein 1.00<(SAG51+SAG52)/(SAG52−SAG51)<2.50, where SAG51 is an on-axis distance from an intersection of an object-side surface of the fifth lens and the optical axis to a vertex of an effective radius of the object-side surface of the fifth lens, and SAG52 is an on-axis distance from an intersection of the image-side surface of the fifth lens and the optical axis to a vertex of an effective radius of the image-side surface of the fifth lens.

7. The camera lens assembly according to claim 1, wherein 2.00<DT62/DT11<6.00, where DT62 is a maximum effective radius of the image-side surface of the sixth lens, and DT11 is a maximum effective radius of an object-side surface of the first lens.

8. A camera lens assembly, sequentially from an object side to an image side of the camera lens assembly along an optical axis, comprising:

a stop;

a first lens having positive refractive power;

a second lens having positive refractive power, a convex object-side surface and a convex image-side surface;

a third lens having negative refractive power and a concave image-side surface;

a fourth lens having refractive power;

a fifth lens having refractive power and a convex image-side surface; and a sixth lens having negative refractive power and a concave image-side surface, wherein 1.00<f2/BFL<3.00, and 91.00<FOV, where f2 is an effective focal length of the second lens, BFL is an optical back focus of the camera lens assembly, and FOV is a maximum field-of-view of the camera lens assembly, 4.10 mm≤ImgH, where ImgH is half of a diagonal length of an effective pixel area on an imaging plane of the camera lens assembly, 3.01 mm<f12/tan(Semi-FOV)<4.50 mm, f12 is a combined focal length of the first lens and the second lens, Semi-FOV is half of a maximum field-of-view of the camera lens assembly, TTL/ImgH≤1.61, where TTL is a distance along the optical axis from an object-side surface of the first lens to an imaging plane of the camera lens assembly, and ImgH is half of a diagonal length of an effective pixel area on the imaging plane, wherein 2.51≤(R6+R12)/(R6−R12)<4.50, where R6 is a radius of curvature of the image-side surface of the third lens, and R12 is a radius of curvature of the image-side surface of the sixth lens, wherein 14.00<CT2/T23<29.00, where CT2 is a center thickness of the second lens along the optical axis, and T23 is a spaced interval between the second lens and the third lens along the optical axis, and the camera lens assembly comprises no more than six lenses.

9. The camera lens assembly according to claim 8, wherein 0.50<f/f5<3.00, where f is a total effective focal length of the camera lens assembly, and f5 is an effective focal length of the fifth lens.

10. The camera lens assembly according to claim 8, wherein 2.00<(R6+R12)/(R6−R12)<4.50, where R6 is a radius of curvature of the image-side surface of the third lens, and R12 is a radius of curvature of the image-side surface of the sixth lens.

11. The camera lens assembly according to claim 8, wherein 2.00<f3/R10<11.00, where f3 is an effective focal length of the third lens, and R10 is a radius of curvature of the image-side surface of the fifth lens.

12. The camera lens assembly according to claim 8, wherein 1.50<(f45+f56)/(f56−f45)<6.50, where f45 is a combined focal length of the fourth lens and the fifth lens, and f56 is a combined focal length of the fifth lens and the sixth lens.

13. The camera lens assembly according to claim 8, wherein 2.00<DT62/DT11<6.00, where DT62 is a maximum effective radius of the image-side surface of the sixth lens, and DT11 is a maximum effective radius of an object-side surface of the first lens.

14. The camera lens assembly according to claim 1, wherein the camera lens assembly is composed of the first to six lenses and a non-lens component comprising the stop.

15. The camera lens assembly according to claim 6, wherein 1.10<(SAG51+SAG52)/(SAG52−SAG51)<2.10.

*  *  *  *  *